(12) United States Patent
Onishi et al.

(10) Patent No.: US 12,380,079 B2
(45) Date of Patent: Aug. 5, 2025

(54) ENTRY CREATION METHOD AND ENTRY CREATION PROGRAM

(71) Applicant: Fujitsu Limited, Kawasaki (JP)

(72) Inventors: Takafumi Onishi, Kawasaki (JP); Yasuhiko Kanemasa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 128 days.

(21) Appl. No.: 18/124,070

(22) Filed: Mar. 21, 2023

(65) Prior Publication Data

US 2024/0020287 A1    Jan. 18, 2024

(30) Foreign Application Priority Data

Jul. 13, 2022  (JP) ................................ 2022-112667

(51) Int. Cl.
*G06F 16/22*  (2019.01)

(52) U.S. Cl.
CPC ................................ *G06F 16/2228* (2019.01)

(58) Field of Classification Search
CPC .................................................. G06F 16/2228
USPC ......................................................... 707/746
See application file for complete search history.

(56) References Cited

U.S. PATENT DOCUMENTS

| | | | | |
|---|---|---|---|---|
| 10,592,137 | B1* | 3/2020 | Khokhar | ................ G06F 3/0659 |
| 2007/0022100 | A1* | 1/2007 | Kitsuregawa | ..... G06F 16/24542 |
| 2013/0263140 | A1* | 10/2013 | Eriksson | ................ G06F 9/4843 |
| | | | | 718/102 |
| 2014/0304525 | A1* | 10/2014 | Novak | ................ G06F 12/1408 |
| | | | | 713/193 |
| 2015/0378619 | A1* | 12/2015 | Maeda | ................ G06F 3/0635 |
| | | | | 707/725 |
| 2019/0361900 | A1* | 11/2019 | Rogynskyy | ............. G06N 5/04 |
| 2021/0075844 | A1* | 3/2021 | Arikuma | ............ H04L 65/1076 |
| 2021/0109935 | A1* | 4/2021 | Hsiao | ................... G06F 9/546 |
| 2022/0067041 | A1* | 3/2022 | Wright | ................. G06F 16/128 |

FOREIGN PATENT DOCUMENTS

| | | |
|---|---|---|
| JP | 2014-199581 A | 10/2014 |
| JP | 2018-533897 A | 11/2018 |
| WO | 2017/072356 A1 | 5/2017 |
| WO | 2019/098199 A1 | 5/2019 |

OTHER PUBLICATIONS

Extended (Supplementary) European Search Report dated Nov. 22, 2023, issued in counterpart European patent application No. 23163134.2. (8 pages).

* cited by examiner

*Primary Examiner* — Giovanna B Colan
(74) *Attorney, Agent, or Firm* — WHDA, LLP

(57) ABSTRACT

A method for creating an entry is performed by a computer. The method includes: determining a first time width equal to or longer than a longest time width among time widths to be read based on a read request from each program to a key-value store that holds data that corresponds to time, as a time width to be associated with one entry in the key-value store; and creating the entry that corresponds to a plurality of data that belongs to a time range of the first time width based on the data for each time and storing the entry in the key-value store.

11 Claims, 31 Drawing Sheets

FIG. 5

| EXAMPLE OF STATE ACCESSES BY USER LOGICS ||
|---|---|
| NAME OF USER LOGIC | CONTENT OF USER LOGIC |
| a | ACQUIRE SPEED AT CURRENT TIME |
| b | ACQUIRE SPEED IN LAST 3 MINUTES |
| c | ACQUIRE SPEED IN LAST 30 MINUTES ONCE EVERY 30 MINUTES AT OR AFTER 12:30:00 |

FIG. 7

| EXAMPLE OF EVENT DATA | |
|---|---|
| TIME INFORMATION | STATE ITEM AND VALUE |
| 12:00:00 | {SPEED : 51, POSITION : (lon0, lat0) , ⋯} |
| 12:00:01 | {SPEED : 51, POSITION : (lon1, lat1) , ⋯} |
| 12:00:02 | {SPEED : 53, POSITION : (lon2, lat2) , ⋯} |
| ... | ... |

FIG. 19

CONTROL INFORMATION STORAGE UNIT — 120

ACCESS PATTERN TABLE — 124

| ACCESS PATTERN NAME | ENTRY TIME WIDTH | CONDITION OF ACCESS TIME WIDTH w |
|---|---|---|
| A | 1 MINUTES | w < 1 MINUTE |
| B | 5 MINUTES | 1 MINUTE ≤ w < 5 MINUTES |
| C | 15 MINUTES | 5 MINUTES ≤ w < 15 MINUTES |
| D | 30 MINUTES | 15 MINUTES ≤ w |

FIG. 20

KVS — 110

| KEY | TIME WIDTH | VALUE |
| --- | --- | --- |
| car1-speed-12:00:00~12:01:00 | 1 MINUTE | ... |
| car1-speed-12:01:00~12:06:00 | 5 MINUTES | ... |
| car1-speed-12:06:00~12:21:00 | 15 MINUTES | ... |
| car1-speed-12:21:00~12:36:00 | 15 MINUTES | ... |
| car1-speed-12:36:00~13:06:00 | 30 MINUTES | ... |

| EXAMPLE OF STATE ACCESSES OF USER LOGICS ||
|---|---|
| NAME OF USER LOGIC | CONTENT OF USER LOGIC |
| a | ACQUIRE SPEED AT CURRENT TIME |
| b | ACQUIRE SPEED IN LAST 3 MINUTES |
| c1 | ACQUIRE SPEED AND POSITION IN LAST 15 MINUTES IN A CASE WHERE POSITION HAS BEEN UPDATED |
| d | ACQUIRE SPEED IN LAST 60 MINUTES EVERY ONE HOUR |

FIG. 22

CONTROL INFORMATION STORAGE UNIT — 120

ACCESS HISTORY INFORMATION — 123a

| TIME | READ STATE NAME-TIME (TIME WIDTH) OF EACH USER LOGIC | | | |
|---|---|---|---|---|
| | a | b | c1 | d |
| 12:00:00 | SPEED-<br>12:00:00<br>(0) | SPEED-<br>11:57:00~12:00:00<br>(3 MINUTES) | SPEED-11:50:00~12:00:00<br>(10 MINUTES)<br>POSITION-11:50:00~12:00:00<br>(10 MINUTES) | SPEED-<br>11:00:00~12:00:00<br>60 MINUTES |
| 12:00:01 | SPEED-<br>12:00:01<br>(0) | SPEED-<br>11:57:01~12:00:01<br>(3 MINUTES) | SPEED-11:50:01~12:00:01<br>(10 MINUTES)<br>POSITION-11:50:01~12:00:01<br>(10 MINUTES) | — |
| ... | ... | ... | ... | ... |

FIG. 23

KVS                                                                                                  110

EXAMPLE OF KVS ENTRY

117

| KEY | TIME WIDTH | VALUE |
|---|---|---|
| car1-speed-latest | ?? (ONE MINUTE FOR SHORTEST) | {12:00:00: {SPEED : 51, POSITION : (lon0, lat0) , ...}, 12:01:00: {SPEED : 51, POSITION : (lon1, lat1) , ...}, ...} |

ENTRY CREATION METHOD AND ENTRY CREATION PROGRAM

CROSS-REFERENCE TO RELATED APPLICATION

This application is based upon and claims the benefit of priority of the prior Japanese Patent Application No. 2022-112667, filed on Jul. 13, 2022, the entire contents of which are incorporated herein by reference.

FIELD

The embodiments discussed herein are related to an entry creation method and an entry creation program.

BACKGROUND

Information processing systems often use key-value store to store data. The key-value store holds keys and values corresponding to the keys. For example, the key-value store is sometimes used to hold time-series data to be used for stream processing and the like.

For example, there is a proposal for a storage system that reads, from a data storage unit that stores divided data obtained by dividing time-series data, the divided data in an interval between first time and second time that a predetermined time has passed since the first time.

Japanese Laid-open Patent Publication No. 2014-199581 is disclosed as related art.

SUMMARY

According to an aspect of the embodiments, a method performed by a computer for creating an entry, the method includes: determining a first time width equal to or longer than a longest time width among time widths to be read based on a read request from each program to a key-value store that holds data that corresponds to time, as a time width to be associated with one entry in the key-value store; and creating the entry that corresponds to a plurality of data that belongs to a time range of the first time width based on the data for each time and storing the entry in the key-value store.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a table illustrating an example of state accesses by user logics;

FIG. 7 is a table illustrating an example of event data;

FIG. 19 is a diagram illustrating an example of an access pattern table according to a third embodiment;

FIG. 20 is a diagram illustrating an example of entries in KVS according to access patterns;

FIG. 21 is a table illustrating an example of state accesses of user logics;

FIG. 22 is a diagram illustrating an example of access history information;

FIG. 23 is a diagram illustrating an example of a KVS entry;

DESCRIPTION OF EMBODIMENTS

Data in a time range having a predetermined time width is sometimes stored in one entry in the key-value store. Furthermore, a read request that specifies the time range with a certain time width is sometimes made to the key-value store. In this case, the number of reads of entries from the key-value store increases in order to read data for the requested time width as the time width of one entry in the key-value store is smaller than the time width for the read request.

In one aspect, an object of the present embodiments is to reduce the number of reads.

Hereinafter, the present embodiments will be described with reference to the drawings.

First Embodiment

A first embodiment will be described.

Figure 1:
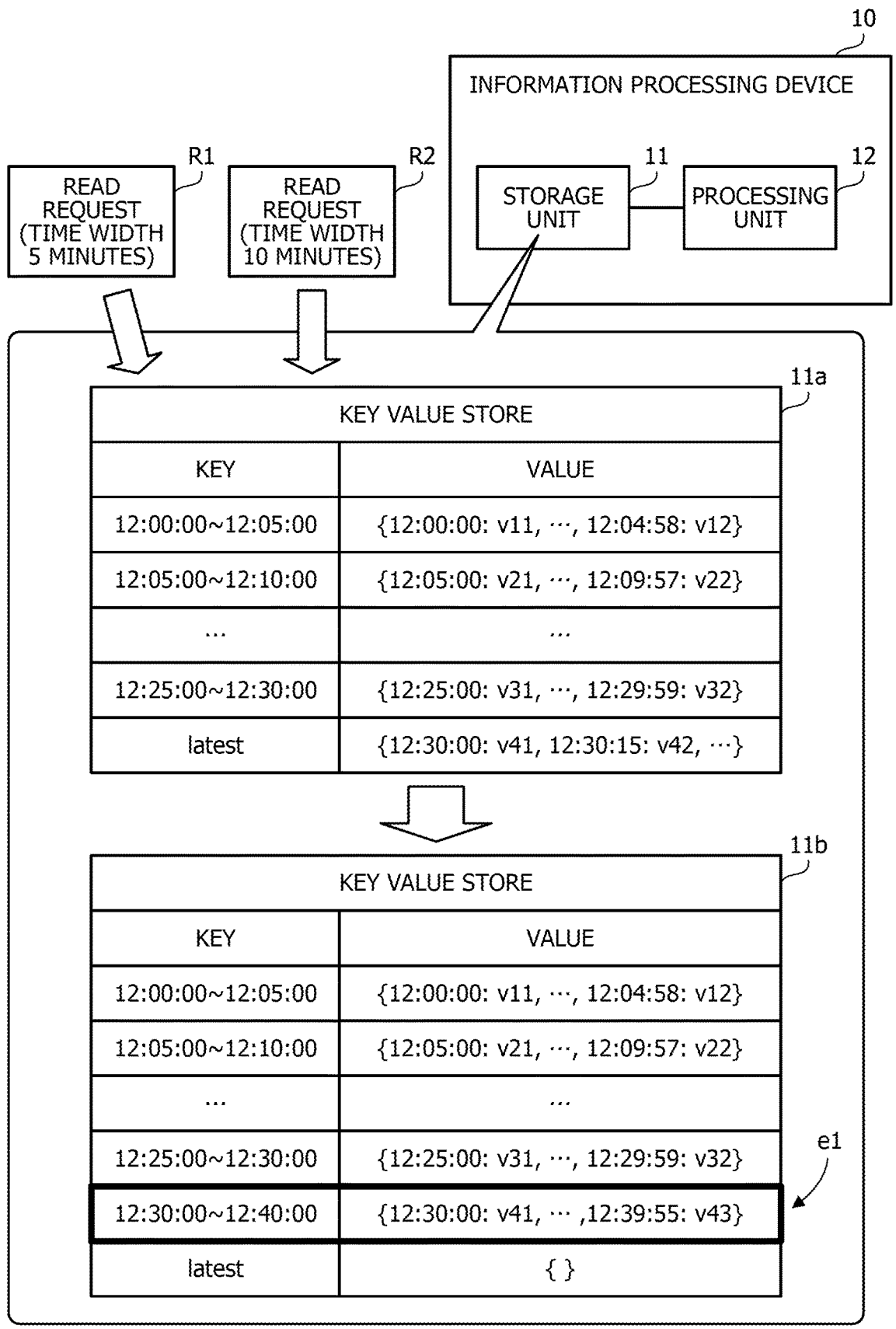
FIG. 1 is a diagram for describing an information processing device according to a first embodiment.

FIG. 1 is a diagram for describing an information processing device according to a first embodiment.

An information processing device 10 includes a storage unit 11 and a processing unit 12. The storage unit 11 may be a volatile storage device such as a random access memory (RAM), or may be a nonvolatile storage device such as a hard disk drive (HDD) or a flash memory. The processing unit 12 may include a central processing unit (CPU), a digital signal processor (DSP), an application specific integrated circuit (ASIC), a field programmable gate array (FPGA), and the like. The processing unit 12 may be a processor that executes a program. The "processor" may include a set of a plurality of processors (multiprocessor).

The storage unit 11 has key-value store 11a. Note that the key-value store 11a may be included in a storage device outside the information processing device 10. The key-value store 11a holds data corresponding to time. Specifically, the key-value store 11a holds an entry having a key and a value corresponding to the key. One entry corresponds to one record. Write and read of data to and from the key-value store 11a are performed in units of entries.

Here, the key is an identifier corresponding to time. The key may be an identifier that corresponds to a time range. The key may include, in addition to time, identification information of a device from which data is obtained, information of a type of data, and the like. The data stored in the key-value store 11a is, for example, data in time-series generated by a device such as a sensor, that is, time-series data. The data has a time stamp indicating the time when the data was generated and a value generated by the device (for example, a measured value of a physical quantity by a sensor). The data may be sensor data generated by a sensor.

In the example of the key-value store 11a, a time range that is a time width of 5 minutes is registered in an item of keys. Furthermore, a plurality of values corresponding to a plurality of pieces of time belonging to the time range that is the time width of five minute time is registered in an item of values. More specifically, the key-value store 11a stores an entry of the key "12:00:00 to 12:05:00" and the values "{12:00:00:v11, . . . , 12:04:58:v12}". This entry indicates the value v11 at 12:00:00, . . . , and the value v12 at 12:04:58 in the time range of the five-minute width from 12:00:00 to 12:05:00. In the example of the key-value store 11a, a plurality of entries corresponding to the time ranges of the five-minute width up to 12:30:00 is registered.

Here, it is assumed that the values corresponding to the key of the time range such as "12:00:00 to 12:05:00" include, for example, data up to the time (for example, "12:04:59") immediately before end time (for example, "12:05:00") and do not include data of the end time.

Furthermore, the key-value store 11a holds an entry that stores the latest data input in time-series until 5 minutes pass from 12:30:00. The key of this entry is, for example, "latest". In the example of the key-value store 11a, values at and after 12:30:00 are recorded in the entry with the key "latest". Then, the processing unit 12 determines the time width to be associated with one entry in the key-value store 11a as follows.

The processing unit 12 accepts a read request from each program to the key-value store 11a. Each program may be executed by the information processing device 10, or may be executed by another information processing device that communicates with the information processing device 10. That is, the information processing device 10 may execute a plurality of programs that uses the data in the key-value store 11a, or accept a plurality of read requests from a plurality of programs executed by other information processing devices. The read request includes the time range to be read. The processing unit 12 reads and responds with the entry having the key corresponding to the appropriate time range from the key-value store 11a in response to the read request.

The processing unit 12 determines a first time width that is equal to or greater than the longest time width among the time widths to be read included in the read requests from each program, as the time width to be associated with one entry in the key-value store 11a. The time width to be read is the time width of the time range specified to be read.

For example, it is assumed that the processing unit 12 accepts read requests R1 and R2 until 5 minutes pass from 12:30:00. The time width to be read for the read request R1 is 5 minutes. The time width to be read for the read request R2 is 10 minutes. The longest time width between the time widths for the read requests R1 and R2 is 10 minutes. In this case, as an example, the processing unit 12 sets 10 minutes as the first time width. Note that there are some cases where settable time width candidates are predetermined such as 5 minutes, 15 minutes, and the like. In that case, the processing unit 12 may set a time width candidate such as 15 minutes, which is longer than 10 minutes and has a small difference from 10 minutes, as the first time width.

The processing unit 12 creates an entry corresponding to a plurality of data belonging to the time range of the first time width based on input data for each time, and stores the entry in the key-value store 11a.

For example, at the point of time 12:35:00, the processing unit 12 has already determined that the first time width is 10 minutes. Therefore, at the point of time 12:35:00, the processing unit 12 does not create an entry with the time width of 5 minutes corresponding to at or after 12:30:00, and continues recording of the values to the entry with the key "latest". Then, it is assumed that no read request longer than the time width of 10 minutes has occurred between 12:35:00 and 12:40:00, and the first time width of 10 minutes is unchanged even at the point of time 12:40:00.

Then, the processing unit 12 creates an entry e1 based on the record of the key "latest" in the key-value store 11a. The entry e1 has the key of "12:30:00 to 12:40:00" and the values of "{12:30:00:v41, . . . , 12:39:55:v43}". The processing unit 12 stores the entry e1 in the key-value store 11a. Key-value store 11b indicates a result of storing the entry e1 in the key-value store 11a. The entry e1 corresponds to the time range from 12:30:00 to 12:40:00 (the time width of 10 minutes).

Furthermore, the processing unit 12 deletes the values of the key "latest" at the point of time the entry e1 has created. The value "{ }" of the key "latest" in the key-value store 11b indicates the result of deleting the values. The entry with the key "latest" stores data input at or after 12:40:00.

According to the information processing device 10, the first time width that is equal to or greater than the longest time width among the time widths to be read based on the read requests from each program to the key-value store 11a is determined as the time width to be associated with one entry in the key-value store 11a. The entry e1 corresponding to the plurality of data belonging to the time range of the first time width is created and stored in the key-value store 11a based on the data for each time.

Thereby, the information processing device 10 can reduce the number of reads. In the above-described example, there is a high possibility that read requests with the time width to be read of 10 minutes will continue to occur like the read request R2 after the occurrence of the read request R2. Therefore, the information processing device 10 will be able to read the requested entry from the key-value store 11*b* with a relatively small number of reads even in a case of accepting the read request with the longest time width in the future by setting the time width of one entry to be equal to or greater than the longest time width. Therefore, the information processing device 10 can speed up the read of entries from the key-value store 11*b*. For example, in a case where the time range to be read is from 12:30:00 to 12:40:00, the information processing device 10 only needs to read the entry e1 once, and can read data at high speed in response to the read request.

Hereinafter, functions of the information processing device 10 will be described in more detail by illustrating an example of a more specific system.

Second Embodiment

Next, a second embodiment will be described.

Figure 2:
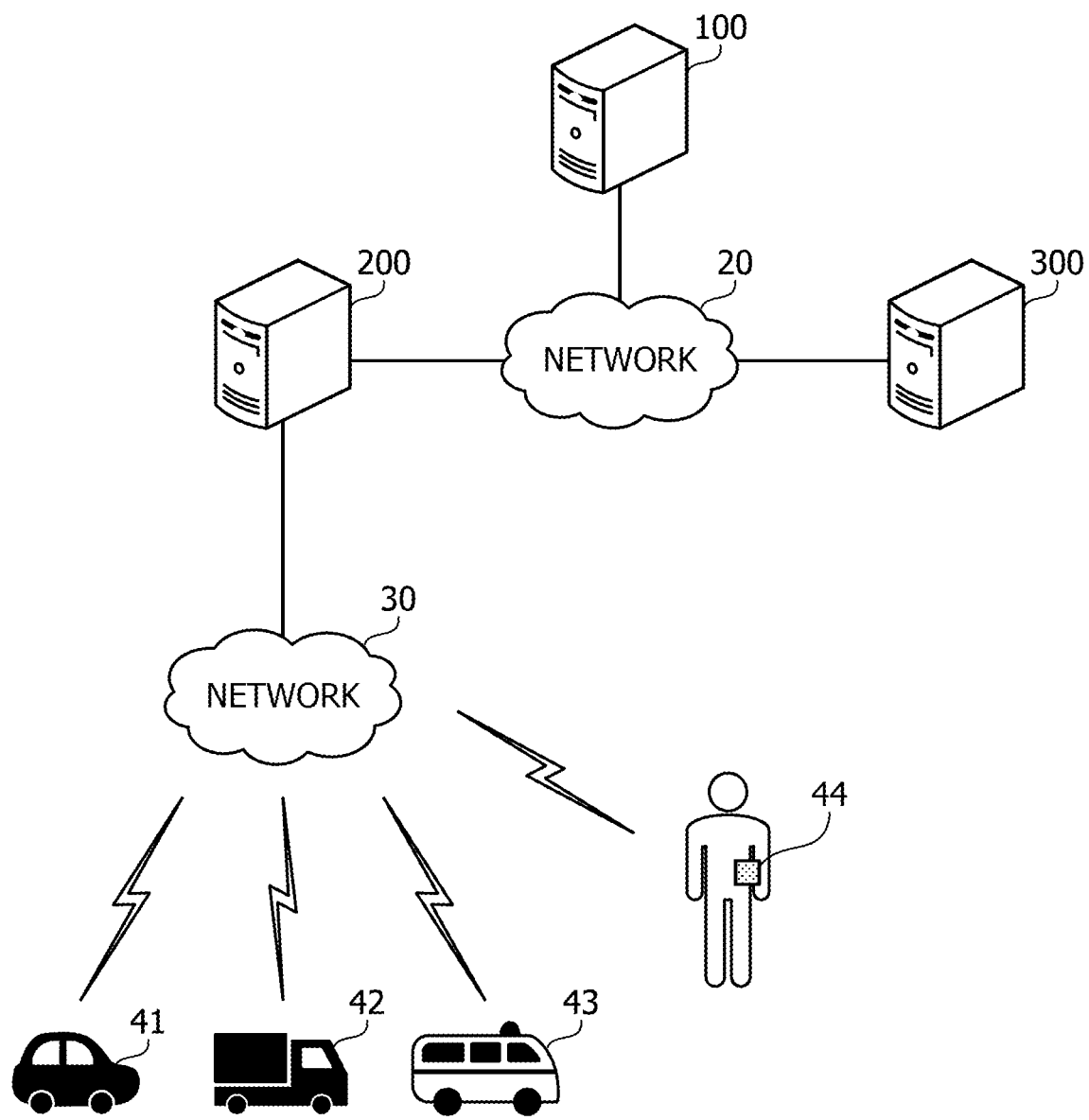
FIG. 2 is a diagram illustrating an example of an information processing system according to a second embodiment.

FIG. 2 is a diagram illustrating an example of an information processing system according to the second embodiment.

The information processing system of the second embodiment includes an information processing device 100 and message queue servers 200 and 300. The information processing device 100 and message queue servers 200 and 300 are coupled to a network 20. The network 20 is, for example, a local area network (LAN). The message queue server 200 is coupled to a network 30. The network 30 is a wide area network (WAN), the Internet, or the like. Connected cars 41, 42, and 43 and an internet of things (IoT) device 44 are coupled to the network 30. The connected cars 41, 42, and 43 and the IoT device 44 have sensors that measure physical quantities such as speed and position.

The information processing system of the second embodiment collects event data such as the speed and position measured by the sensors of the connected cars 41, 42, and 43 and the sensors of the IoT device 44. The event data may be referred to as sensor data. The event data is transmitted from the connected cars 41, 42, and 43 and the IoT device 44 in time-series. Therefore, the event data is a kind of time-series data. The information processing system executes stream processing for the event data input in time-series. The stream processing may be referred to as event stream processing.

The information processing system provides various services to users of the connected cars 41, 42, and 43 and the IoT device 44 according to a results of the stream processing. For example, a service that detects sway of a vehicle body from changes in speed over a certain time and warns the user of the appropriate vehicle, a service that notifies congestion information, detour route information, and the like to the users of vehicles in the vicinity of an appropriate road in a case where there is a large number of vehicles staying on the road, and the like are conceivable.

The information processing device 100 is a server computer that receives the event data from the message queue server 200 and executes the stream processing based on the event data. The event data includes time stamps and measured values by the sensors. Furthermore, a program that describes processing content of the stream processing is called user logic. One entry in KVS is a <key:value>, that is, a pair of key and value. Data is written to and read from KVS in units of entries.

The information processing device 100 holds the received event data and data obtained by processing the event data by the user logic in the key-value store (KVS). The information processing device 100 reads data from the KVS and writes data to the KVS in response to user logic requests. The information processing device 100 may also transmit a processing result of the user logic to the message queue server 300 as new event data.

The message queue servers 200 and 300 are server computers that function as message queues, respectively. A message queue is a queue that holds the received event data.

The message queue server 200 stores the event data received from the connected cars 41, 42, and 43 and the IoT device 44 in the message queue of the message queue server 200. The message queue server 200 transmits the event data stored in the message queue to the information processing device 100.

The message queue server 300 stores the event data received from the information processing device 100 in the message queue of the message queue server 300. The message queue server 300 transmits the event data stored in the message queue to the information processing device 100 or another server computer that executes a predetermined service according to the event data. Here, in FIG. 2, illustration of the another server computer is omitted. The another server computer may transmit the above-described warning of sway, congestion information, detour route information, and the like to the connected cars 41, 42, and 43 and the IoT device 44. The processing for providing the predetermined service may be executed by the information processing device 100.

In the information processing system of the second embodiment, each management unit of the connected cars 41, 42, and 43 and the IoT device 44 is called object. For example, the objects respectively corresponding to the connected cars 41, 42, and 43 may be referred to as vehicle objects. Furthermore, in a case where the IoT device 44 acquires information regarding a person, the IoT device 44 may be referred to as a human object. An object is information obtained by mapping a human, a device, or the like in a real world onto the information processing system. The object mapped to the information processing system is sometimes said to be a digital twin of the human, device, or the like in the real world.

Data representing a state of an object is called state. For example, a vehicle state includes information of speed, position, vehicle type, whether a wiper is on, or the like. Data of the state is associated with time information when the data was acquired by a sensor or the like, that is, a time stamp. In the processing of the user logic in the information processing device 100, a certain time width is often specified from a data group of states existing in time-series and an access is made.

At this time, the time width required at the time of read differs for each user logic or state. Furthermore, the time width in which the user logic accesses the state is dynamic and unknown. The number of reads increases when the time width per entry in the KVS is smaller than the time width at the time of read access. For example, in a case where the time width of one entry is fixed to 1 minute determined in advance, that is, at least ten entries are read, that is, entries are read at least ten times, in response to the read request to read data for 10 minutes. Similarly, at least thirty entries are read, that is, entries are read at least thirty times, in response to the read request to read data for 30 minutes.

In this way, when storing time-series data in the KVS, for example, using a time width or a uniform time width for the entire digital twins determined in advance, there is a possibility that the number of read accesses increases and an execution time of the processing becomes long. Meanwhile, read is performed from the KVS in units of entries. Therefore, if the time width of one entry in the KVS is set to be very long in advance, extra data in the entry will be read together at the time of reading even if the time width of the read request is relatively short, and read cost increases compared to the time width of the read request.

Therefore, the information processing device 100 provides a function to control the time width of one entry in the KVS so as to efficiently perform read from the KVS.

Figure 3:
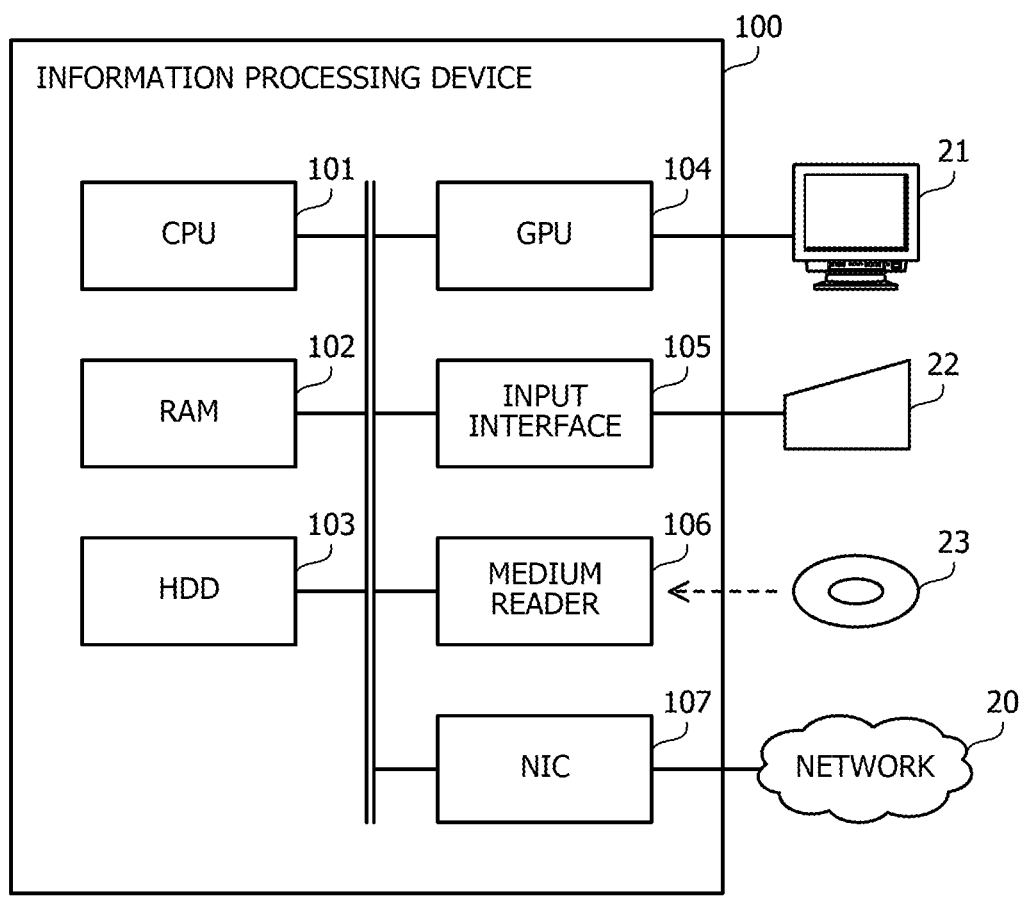
FIG. 3 is a diagram illustrating a hardware example of the information processing device.

FIG. 3 is a diagram illustrating a hardware example of the information processing device.

The information processing device 100 includes a CPU 101, a RAM 102, an HDD 103, a graphics processing unit (GPU) 104, an input interface 105, a medium reader 106, and a network interface card (NIC) 107. Note that the CPU 101 is an example of the processing unit 12 according to the first embodiment. The RAM 102 or the HDD 103 is an example of the storage unit 11 according to the first embodiment.

The CPU 101 is a processor that executes program instructions. The CPU 101 loads at least a part of programs and data stored in the HDD 103 into the RAM 102 and executes the program. Note that the CPU 101 may include a plurality of processor cores. Furthermore, the information processing device 100 may include a plurality of processors. The processing to be described below may be executed in parallel using a plurality of processors or processor cores. Furthermore, a set of the plurality of processors is sometimes referred to as a "multiprocessor" or simply a "processor".

The RAM 102 is a volatile semiconductor memory that temporarily stores the program executed by the CPU 101 and data used by the CPU 101 for arithmetic operations. Note that the information processing device 100 may include a memory of a type other than the RAM or may include a plurality of memories.

The HDD 103 is a nonvolatile storage device that stores software programs such as an operating system (OS), middleware, and application software, and data. Note that the information processing device 100 may include other types of storage devices such as a flash memory and a solid state drive (SSD) and may include a plurality of nonvolatile storage devices.

The GPU 104 outputs an image to a display 21 coupled to the information processing device 100 in accordance with the instruction from the CPU 101. As the display 21, any type of display such as a cathode ray tube (CRT) display, a liquid crystal display (LCD), a plasma display, or an organic electro-luminescence (OEL) display can be used.

The input interface 105 acquires an input signal from an input device 22 coupled to the information processing device 100 and outputs the acquired input signal to the CPU 101. As the input device 22, a pointing device such as a mouse, a touch panel, a touch pad, or a trackball, a keyboard, a remote controller, a button switch, or the like can be used. Furthermore, a plurality of types of input devices may be coupled to the information processing device 100.

The medium reader 106 is a reading device that reads a program and data recorded on a recording medium 23. As the recording medium 23, for example, a magnetic disk, an optical disk, a magneto-optical (MO) disk, a semiconductor memory, or the like can be used. The magnetic disk includes a flexible disk (FD) and an HDD. The optical disk includes a compact disc (CD) and a digital versatile disc (DVD).

The medium reader 106 copies the program and data read from the recording medium 23 to another recording medium such as the RAM 102 or the HDD 103, for example. The read program is executed by the CPU 101, for example. Note that the recording medium 23 may be a portable recording medium and is sometimes used for distribution of the program and data. Furthermore, the recording medium 23 and the HDD 103 are sometimes referred to as computer-readable recording media.

The NIC 107 is an interface that is coupled to the network 20 and communicates with another computer through the network 20. The NIC 107 is coupled to a communication device such as a switch or a router by a cable, for example. The NIC 107 may be a wireless communication interface.

Note that the message queue servers 200 and 300 are also implemented by hardware similar to the information processing device 100. Furthermore, the connected cars 41, 42, and 43 and the IoT device 44 are implemented by hardware including a CPU, a RAM, an SSD, a wireless communication interface, and sensors.

Figure 4:
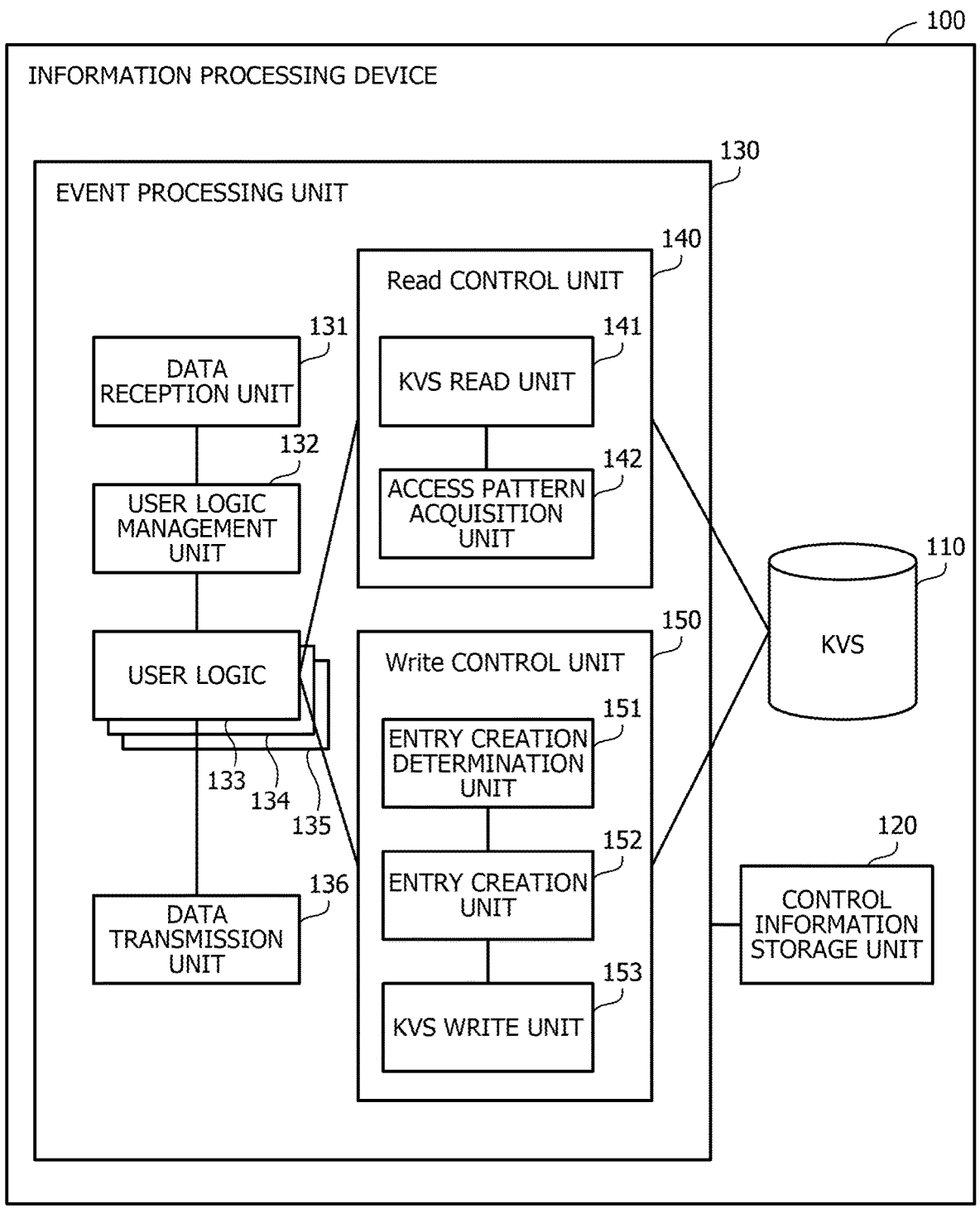
FIG. 4 is a diagram illustrating a functional example of the information processing device.

FIG. 4 is a diagram illustrating an example of functions of the information processing device.

The information processing device 100 has KVS 110, a control information storage unit 120, and an event processing unit 130. Storage areas of the RAM 102 and the HDD 103 are used for the KVS 110 and the control information storage unit 120. The event processing unit 130 is implemented by the CPU 101 executing a program stored in the RAM 102.

The KVS 110 is a storage that holds the keys and values. The keys include the time range. The values include the sensor measured values at each time belonging to the time range.

The control information storage unit 120 stores control information to be used for processing by the event processing unit 130.

The event processing unit 130 executes the stream processing for the event data received from the message queue server 200. The event processing unit 130 has a data reception unit 131, a user logic management unit 132, user logics 133, 134, and 135, a data transmission unit 136, a read control unit 140, and a write control unit 150.

The data reception unit 131 receives the event data from message queue server 200.

The user logic management unit 132 holds a list of the user logics 133, 134, and 135, and executes the user logic to be executed based on the event data received by the data reception unit 131.

The user logics 133, 134, and 135 acquire the event data received by the data reception unit 131 and read the data stored in the KVS 110 via the read control unit 140. The user logics 133, 134, and 135 execute processing related to the user logics 133, 134, and 135 based on these data. Furthermore, the user logics 133, 134, and 135 write processing result data to the KVS 110 via the write control unit 150. The event processing unit 130 may have user logics other than the user logics 133, 134, and 135.

The data transmission unit 136 transmits the processing result data of the event processing unit 130 to an external device such as the message queue server 300, for example.

The read control unit 140 controls data read from the KVS 110. The read control unit 140 has a KVS read unit 141 and an access pattern acquisition unit 142.

The KVS read unit 141 accesses the KVS 110 and executes read of data from the KVS. For example, the KVS read unit 141 reads entries with keys corresponding to the time ranges included in the read requests of the user logics 133, 134, 135 from the KVS 110, and responds to the user logics 133, 134, 135.

The access pattern acquisition unit 142 acquires a pattern of an access of read to the KVS 110 in response to the read request, that is, a pattern of read access, based on data read from the KVS 110 by the KVS read unit 141. The pattern of read access is simply called an access pattern. The access pattern acquisition unit 142 stores acquired access pattern information in the control information storage unit 120.

The write control unit 150 controls data write to the KVS 110. The write control unit 150 has an entry creation determination unit 151, an entry creation unit 152, and a KVS write unit 153.

The entry creation determination unit 151 determines the time width to be associated with one entry in the KVS 110 based on access pattern information stored in the control information storage unit 120.

The entry creation unit 152 creates an entry for the KVS 110 by specifying an arbitrary key. For example, the entry creation unit 152 creates the entry for the KVS 110 by specifying the time range corresponding to the time width determined by the entry creation determination unit 151 as the key.

The KVS write unit 153 accesses the KVS 110 and writes the entry created by the entry creation unit 152 to the KVS 110.

Note that the information processing device 100 may have a plurality of event processing units including the event processing unit 130. For example, the processing result data by an upstream event processing unit may be input to a downstream event processing unit, and processing by the downstream event processing unit may be executed. In that case, for example, the data transmission unit of the upstream event processing unit may transmit the processing result data to the downstream event processing unit. Furthermore, as data reception, the downstream event processing unit may receive the processing result data from the upstream event processing unit.

FIG. 5 is a table illustrating an example of state accesses by the user logics.

Table 51 illustrates an example of state accesses by the user logic 133, 134, and 135. Here, as an example, it is assumed that the state accessed by the user logics 133, 134, and 135 is speed. Note that the information processing device 100 does not have to have information corresponding to the table 51.

In the table 51, items of name of the user logics and content of the user logics. The name of the user logic 133 is user logic "a". The name of the user logic 134 is user logic "b". The name of the user logic 135 is user logic "c".

For example, the content of the user logic 133, that is, the content of the user logic "a", is to acquire the speed at current time. The content of the user logic 134, that is, the content of the user logic "b", is to acquire the speed of the last 3 minutes. The content of the user logic 135, that is, the content of user logic "c", is to acquire the speed of the last 30 minutes once every 30 minutes at and after 12:30:00.

Figure 6:
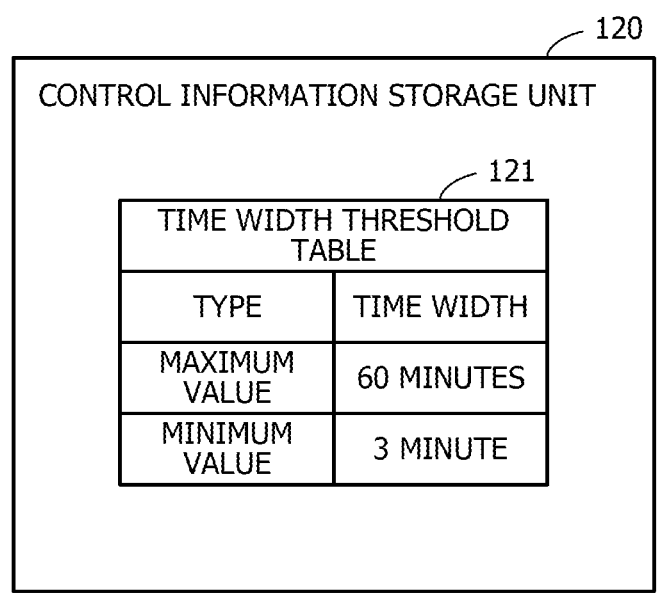
FIG. 6 is a diagram illustrating an example of a time width threshold table.

FIG. 6 is a diagram illustrating an example of a time width threshold table.

A time width threshold table 121 is information that holds a maximum value and a minimum value of the time width to be associated with one entry in the KVS 110. The time width threshold table 121 is stored in the control information storage unit 120 in advance. The time width threshold table 121 includes items of type and time width.

For example, the time width threshold table 121 indicates that the time width of the type "maximum value" is "60 minutes". This indicates that regardless of an access status of the KVS 110, the data to be stored in one entry is time-series data for at most 60 minutes.

Furthermore, the time width threshold table 121 indicates that the time width of the type "minimum value" is "3 minutes". This indicates that regardless of the access status to the KVS 110, time-series data for at least 3 minutes is stored in the same entry.

FIG. 7 is a table illustrating an example of the event data.

An event data group 52 describes a plurality of pieces of event data arriving at the information processing device 100 in a tabular form. One piece of event data has the time information, and the state items and values. The time information is a time stamp indicating the time when the event data was generated by the sensor or the like. The state items and values are a set of a state identifier and the value corresponding to the state. One piece of event data can include a plurality of sets of state items and values.

For example, the event data with the time information "12:00:00" has "{speed: 51, position: (lon0, lat0), ... }" as the state items and values. Here, the speed is expressed in units of km/h (kilometers per hour) or the like. Furthermore, the position is represented by (longitude, latitude) coordinates, for example. Furthermore, although not illustrated, each event data has an object name corresponding to a transmission source device.

Figure 8:
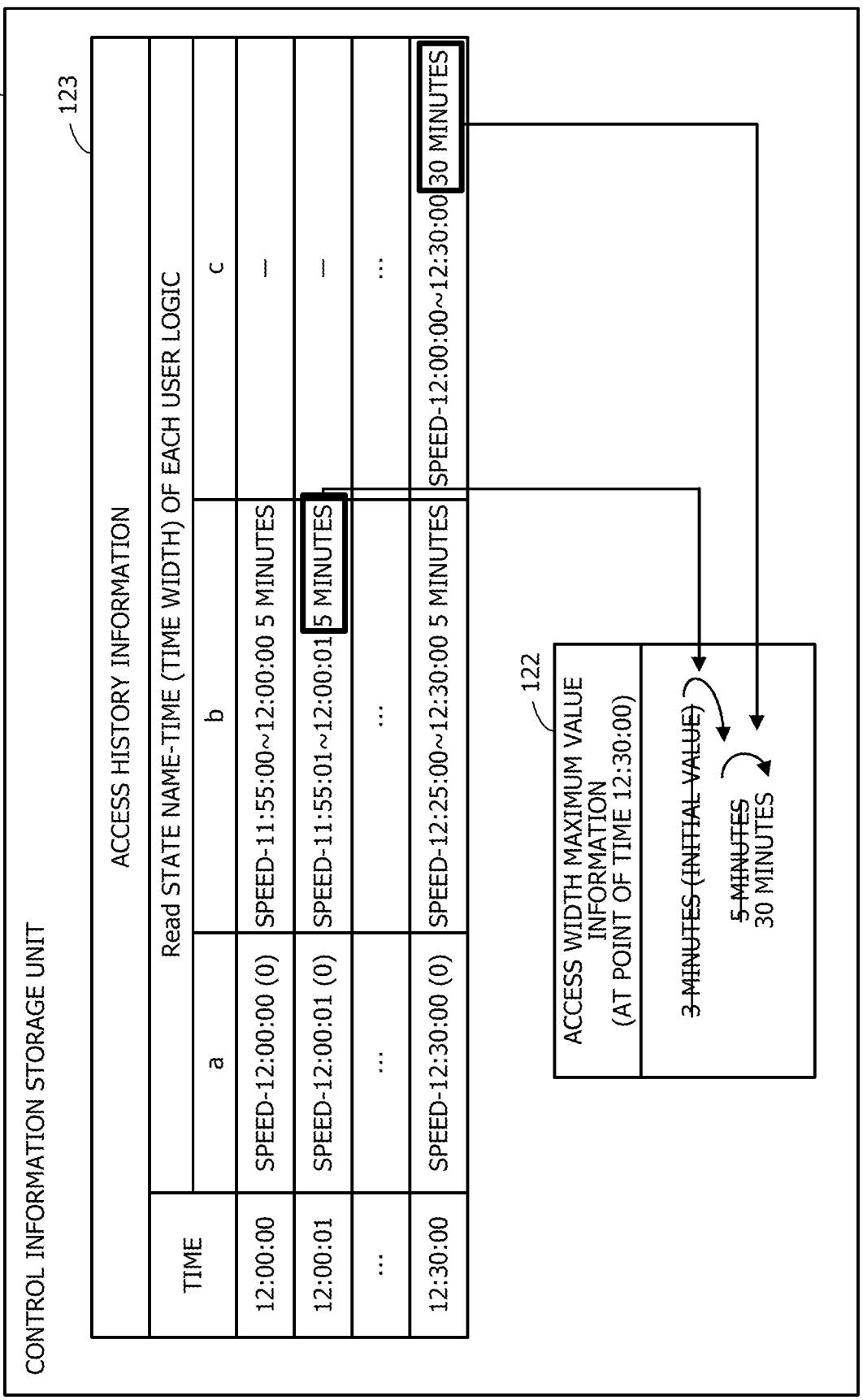
FIG. 8 is a diagram illustrating an example of access width maximum value information.

FIG. 8 is a diagram illustrating an example of access width maximum value information.

Access width maximum value information 122 is an example of the access pattern information generated by the access pattern acquisition unit 142. The access width maximum value information 122 is created by access pattern acquisition unit 142 and stored in the control information storage unit 120. The access width maximum value information 122 is created for each object and state. As an example, the access width maximum value information 122 holds the access width maximum value of read from the KVS 110 for the state "speed" of a certain object. The access width maximum value is the maximum value of the time width (access time width) to be accessed by the read request.

The access width maximum value information 122 is reset to an initial value when a new entry corresponding to the appropriate state of the appropriate object is written to the KVS 110. The initial value of the access width maximum value is the minimum value "3 minutes" set in the time width threshold table 121.

For example, the access pattern acquisition unit 142 updates the access width maximum value information 122 as follows based on the read accesses of the state "speed" of the appropriate object in the KVS 110 by the user logics "a" to "c". Note that the initial time is assumed to be 12:00:00. At the time 12:00:00, the access width maximum value information 122 is 3 minutes (initial value).

Access history information 123 indicates a history of the read accesses of the state "speed" of the appropriate object every second from the initial time 12:00:00 by the user logics "a" to "c". The access pattern acquisition unit 142 is only required to acquire the time width of access by each user logic at each time. The access history information 123 expresses the access history in an easy-to-understand manner, and does not have to be stored in the control information storage unit 120.

In the access history information 123, the access history is described by description of a set "read state name-time" of the state (read state) name to be read and the time to be read by each user logic. The time to be read is sometimes the time range. Furthermore, in the parentheses after the "read state name-time", the time width to be accessed is described. Here, the state to be read is speed. Therefore, the "read state name" is the "speed".

For example, at the time 12:00:00, the following read access occurs. The first read access is the read access of "speed-12:00:00(0)" by the user logic "a". This indicates the read access of 12:00:00 (time width 0) to the speed. The second read access is the read access of "speed-11:55:00 to 12:00:00 (5 minutes)" by the user logic "b". This indicates the read access from 11:55:00 to 12:00:00 (time width 5 minutes) to the speed. Note that no read access by the user logic "c" occurs from the time 12:00:00 to 12:29:59. No access is indicated by a hyphen symbol "-" in the figure.

Furthermore, at the time 12:00:01, the next read access occurs. The first read access is the read access of "speed-12:00:01(0)" by the user logic "a". The second read access is the read access of "speed-11:55:01 to 12:00:01 (5 minutes)" by the user logic "b".

At the point of time 12:00:01, the read access occurs with the time width of "5 minutes" longer than the "3 minutes" held in the access width maximum value information 122. Therefore, the access pattern acquisition unit 142 updates the access width maximum value information 122 with "5 minutes" from "3 minutes". Hereafter, it is assumed that the time width of one entry stored in the KVS 110 is determined to be 5 minutes.

The speed at each time is read by the user logic "a" and the speed of the last 5 minutes at each time is read by the user logic "b" from the KVS 110 until the time 12:29:59.

Then, at the point of time 12:30:00, the next read access occurs. The first read access is the read access of "speed-12:30:00(0)" by the user logic "a". The second read access is the read access of "speed-12:25:00 to 12:30:00 (5 minutes)" by the user logic "b". The third read access is the read access of "speed-12:00:00 to 12:30:00 (30 minutes)" by the user logic "c".

At the point of time 12:30:00, the read access occurs with the time width of "30 minutes" longer than the "5 minutes" held in the access width maximum value information 122. Therefore, the access pattern acquisition unit 142 updates the access width maximum value information 122 with "30 minutes" from "5 minutes".

Figure 9:
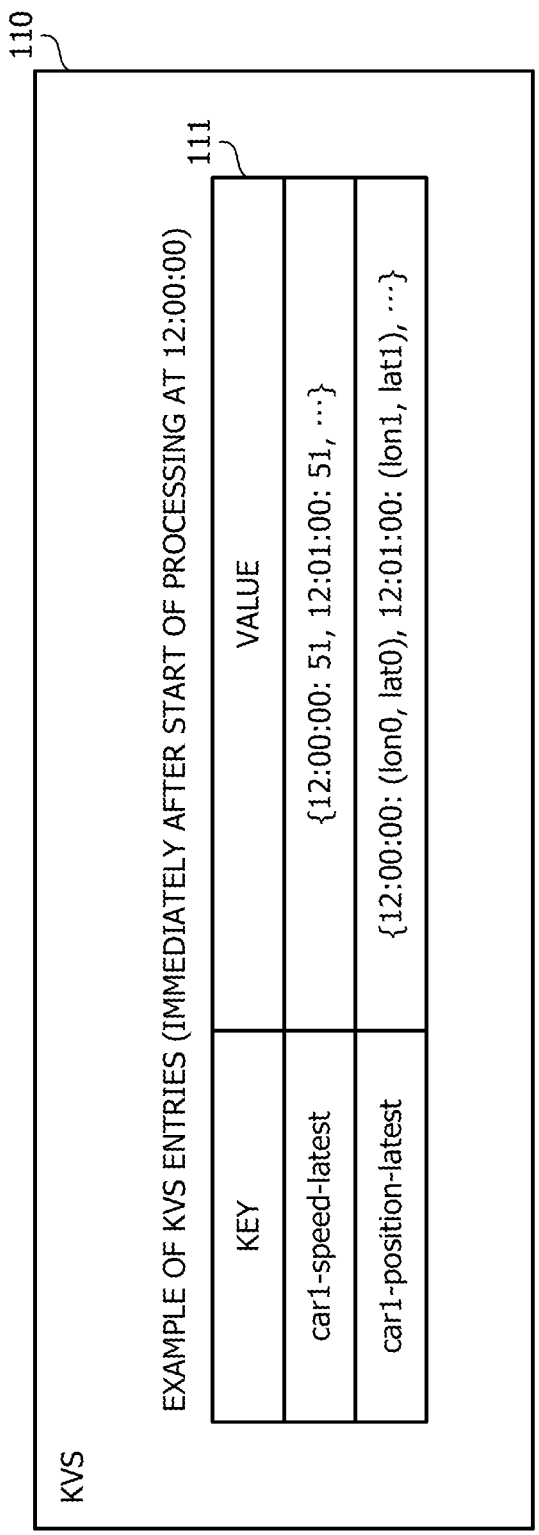
FIG. 9 is a diagram illustrating an example of KVS entries.

FIG. 9 is a diagram illustrating an example of KVS entries.

A KVS entry group 111 is an example of entries stored in the KVS 110. One entry has a key described as "object name-state name-time" and a measured value corresponding to the state name at an appropriate time. The time included in the key may be the time range. In the case where the time included in the key is the time range, the value includes a plurality of measured values corresponding to a plurality of pieces of time belonging to the time range.

Furthermore, the KVS entry group 111 has an entry in which "latest" is set in the item of time of the key as an entry in which data of the latest time is stored. The entry in which "latest" is set for the item of time of the key is called latest entry. For example, at the point of time of the time 12:00:00 immediately after the start of the stream processing by the information processing device 100, the KVS 110 holds only the entry with the item of time in the key "latest" for any object and state.

For example, the KVS entry group 111 indicates the entries of the KVS 110 immediately after the start of processing at the time 12:00:00 (for example, at the point of time about 1 to 2 minutes have passed). "car1" in the key "car1-speed-latest" is an example of the object name corresponding to a certain connected car. Furthermore, "speed" is the state name of the state "speed". Moreover, "position" in the key "car1-position-latest" is the state name of the state "position".

When data of a specific time width indicated by the access width maximum value information 122 is accumulated in the latest entry, the entry creation unit 152 moves the data to another entry as old time-series data to empty the latest entry. Note that the entry creation unit 152 may hold a pointer such as "car1-speed-12:00:00 is the latest entry" without using "latest". The entry creation unit 152 may newly create an entry "car1-speed-12:05:00" when data of a specific time width is accumulated in the latest entry, and update the pointer with "car1-speed-12:05:00 is the latest entry".

An entry is created in the KVS 110 for the access width maximum value information 122 in FIG. 8 as follows.

Figure 10:
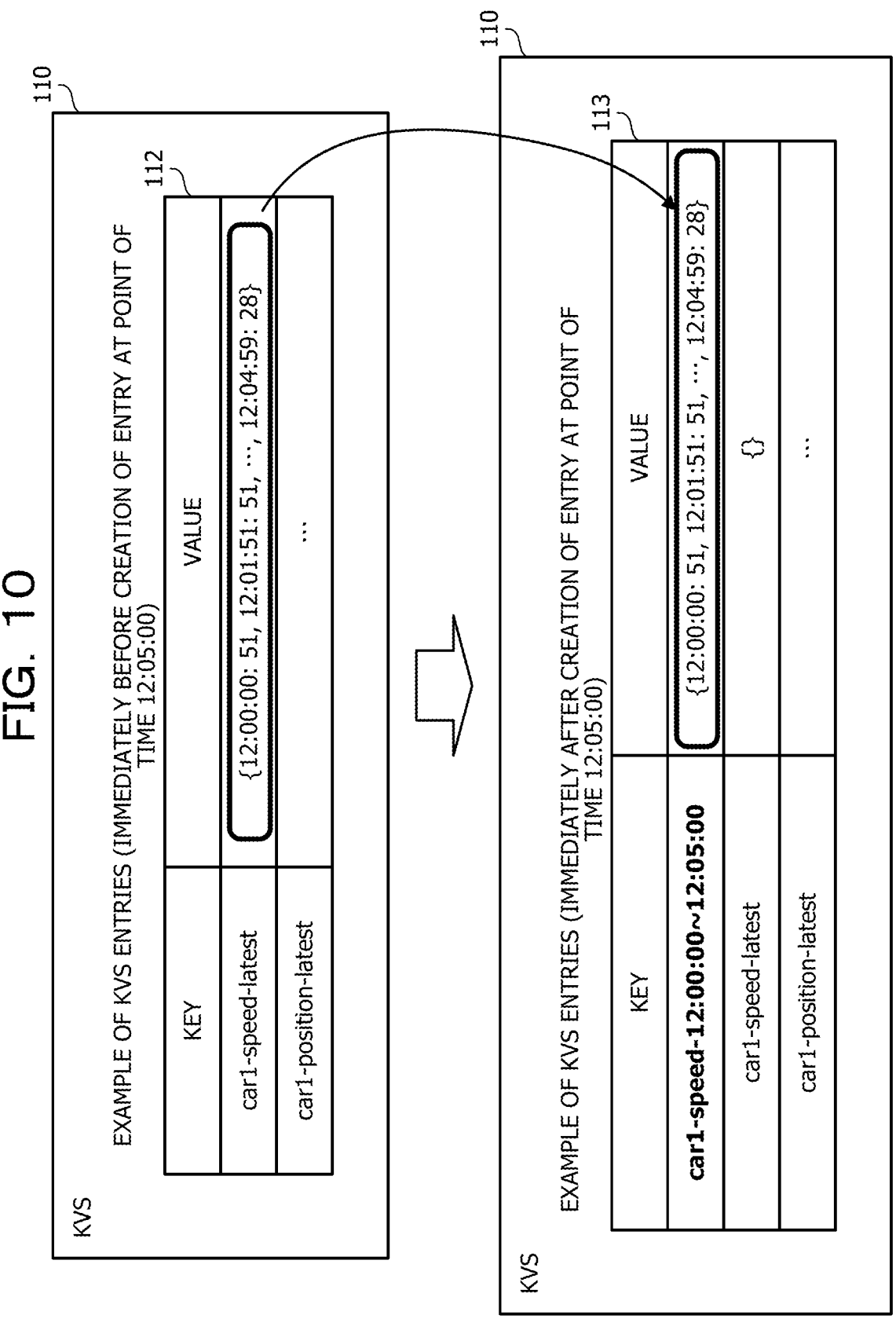
FIG. 10 is a diagram illustrating an example of creating a KVS entry.

FIG. 10 is a diagram illustrating an example of creating a KVS entry.

The entry creation determination unit 151 detects that the time has passed by the time width of the access width maximum value information 122 since the start of storage in the latest entry. Then, the entry creation unit 152 creates a separate entry and stores the content of the latest entry at that point of time in the KVS 110 via the KVS write unit 153. Thereafter, the entry creation unit 152 initializes the content of the latest entry in the KVS 110 via the KVS write unit 153. Subsequent data is stored in the initialized latest entry. Note that, at this time, the entry creation determination unit 151 also initializes the access width maximum value information 122 together.

Here, a KVS entry group 112 indicates each entry of the KVS 110 immediately before entry creation at the point of time 12:05:00. Furthermore, a KVS entry group 113 indicates each entry of the KVS 110 immediately after the entry creation at the point of time 12:05:00.

For example, the entry creation determination unit 151 detects that the access width maximum value information 122 indicates "5 minutes" at the point of time 12:05:00. Then, the entry creation determination unit 151 determines that no data will be stored in the same entry anymore because the latest entry stores the time-series data for 5 minutes from 12:00:00 to 12:04:59. Then, the entry creation unit 152 copies the value of the key "car1-speed-latest", which is the latest entry, to the entry with the key "car1-speed-12:00:00 to 12:05:00" according to the determination of the entry creation determination unit 151. Furthermore, the entry creation unit 152 empties the value of "car1-speed-latest". Moreover, the entry creation determination unit 151 initializes the access width maximum value information 122 in order to collect the access status again from 12:05:00 onwards.

Figure 11:
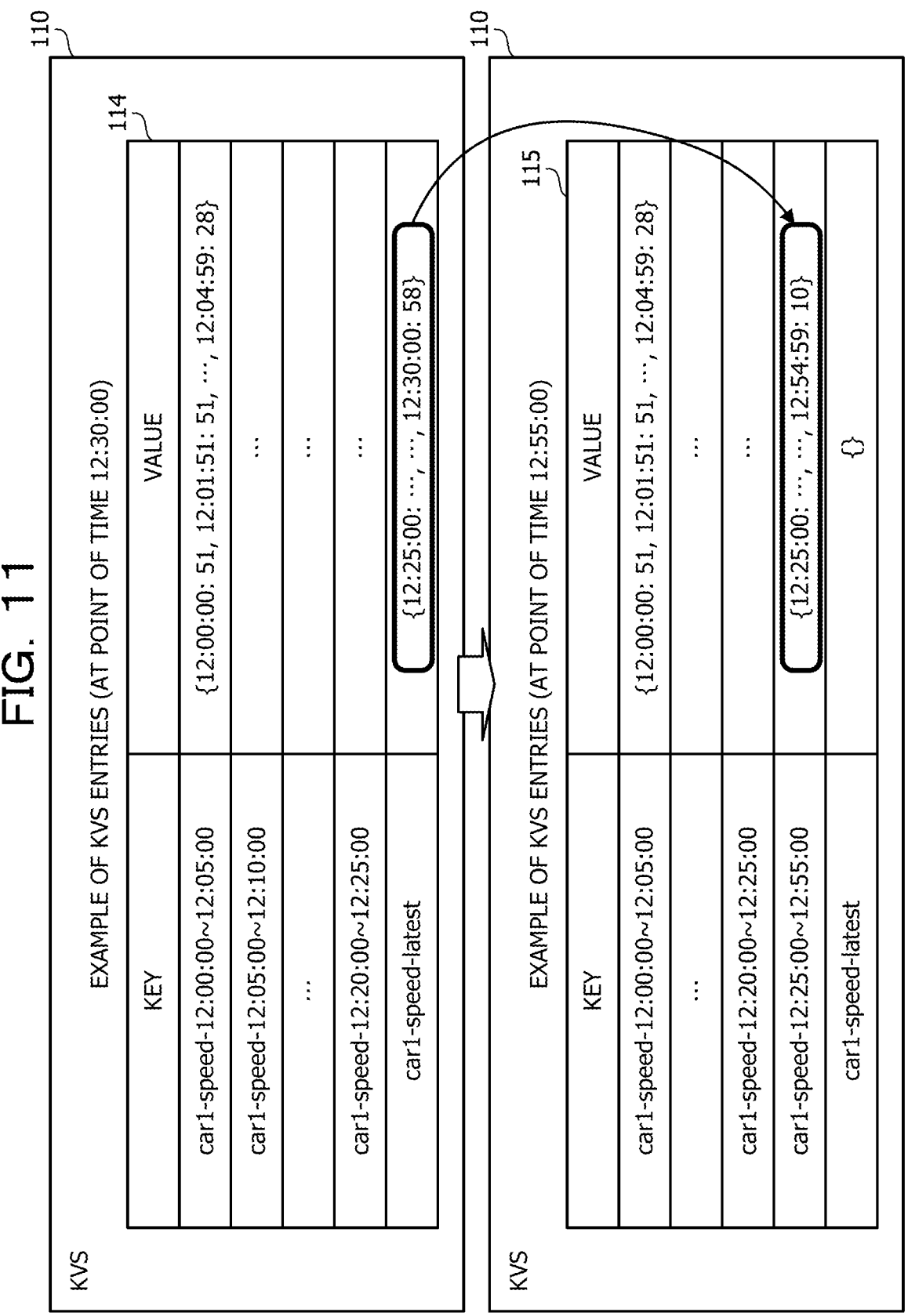
FIG. 11 is a diagram illustrating an example of creating a KVS entry.

FIG. 11 is a diagram illustrating an example of creating a KVS entry.

It is assumed that the entry for the KVS 110 is created every maximum value "5 minutes" of the time width of the read access by the user logic from 12:00:00 to 12:25:00. Meanwhile, at the point of time 12:30:00, the read access with the width of 30 minutes is executed. Therefore, the access pattern acquisition unit 142 updates the access width maximum value information 122 with "30 minutes" as illustrated in FIG. 8.

Here, a KVS entry group 114 indicates each entry of the KVS 110 at the point of time 12:30:00. Furthermore, a KVS entry group 115 indicates each entry of the KVS 110 at the point of time 12:55:00.

At the point of time 12:30:00, the entry creation determination unit 151 ongoingly waits until data for 30 minutes is stored in the latest entry although 5 minutes have passed since the start of storage in the latest entry. Then, at the point of time 12:55:00, the entry creation determination unit 151 detects that 30 minutes have passed since the start of storage in the latest entry, and instructs the entry creation unit 152 to create the entry with the time width of 30 minutes.

Then, the entry creation unit 152 stores the value of the latest entry in another entry with the time width of 30 minutes via the KVS write unit 153, and initializes the latest entry. Furthermore, the entry creation determination unit 151 initializes the access width maximum value information 122.

Next, a processing procedure of the information processing device 100 according to the second embodiment will be described.

Figure 12:
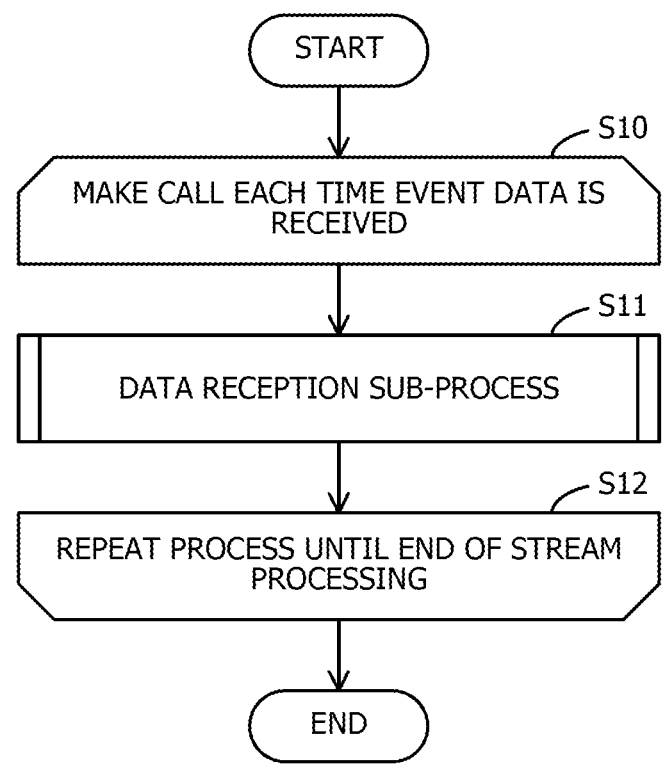
FIG. 12 is a flowchart illustrating an example of stream processing.

FIG. 12 is a flowchart illustrating an example of stream processing.
- (S10) The event processing unit 130 calls a data reception sub-process of step S11 each time the event data is received.
- (S11) The event processing unit 130 executes the data reception sub-process. Details of the data reception sub-process will be described below.
- (S12) The event processing unit 130 repeats step S11 until the stream processing according to the received event data ends. For example, in the case where the event data includes a plurality of states, the stream processing for each state may be performed. Then, the stream processing ends.

Figure 13:
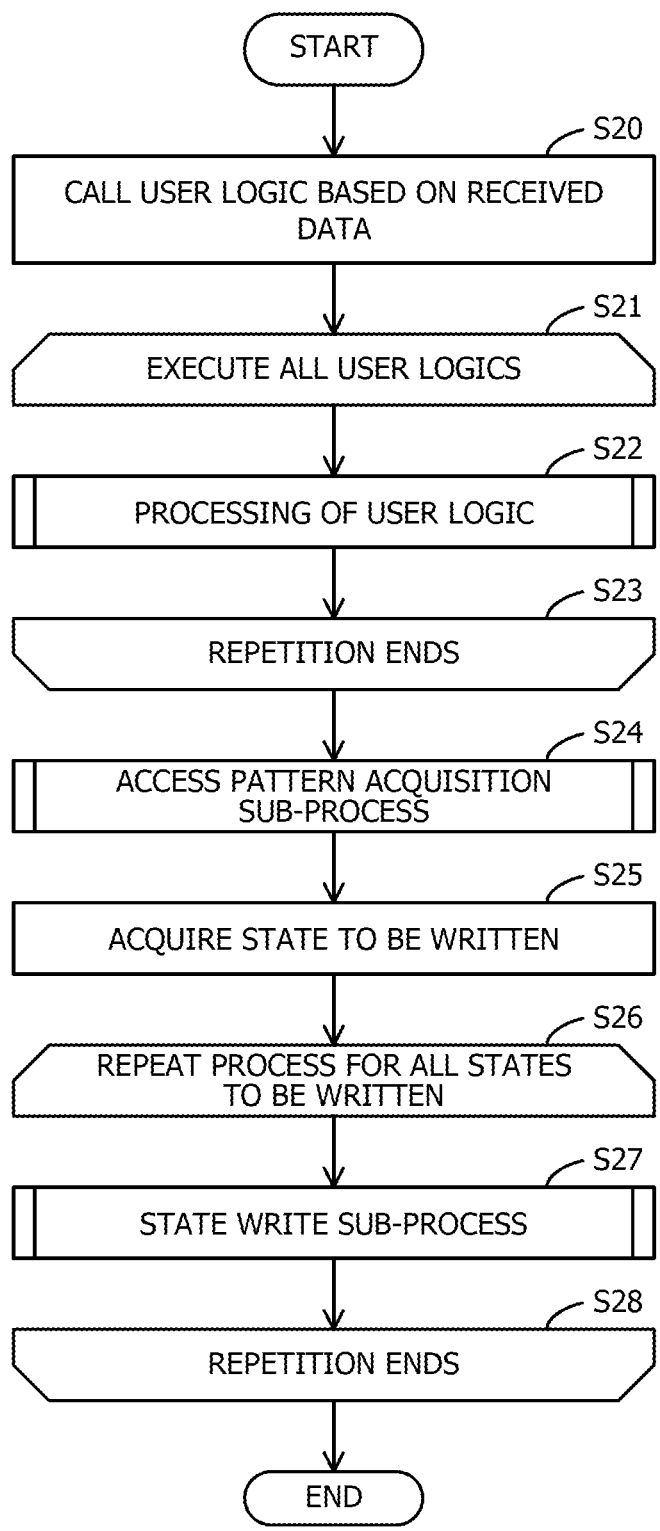
FIG. 13 is a flowchart illustrating an example of a data reception sub-process.

FIG. 13 is a flowchart illustrating an example of the data reception sub-process.

The data reception sub-process corresponds to step S11.
- (S20) The user logic management unit 132 calls all the user logics corresponding to the event data based on the event data received by the data reception unit 131.
- (S21) All the called user logics repeatedly execute step S22.
- (S22) The user logics execute the processing based on the received event data and the data read from the KVS 110. Details of the processing of the user logics will be described below.
- (S23) When the processing of all the user logics ends, the processing proceeds to step S24.
- (S24) The read control unit 140 executes an access pattern acquisition sub-process. Details of the access pattern acquisition sub-process will be described below.
- (S25) The write control unit 150 acquires the data of the state to be written to the KVS 110.
- (S26) The write control unit 150 repeatedly executes step S27 for all the states to be written.
- (S27) The write control unit 150 executes a state write sub-process. Details of the sub-process to be read will be described below.
- (S28) When the write control unit 150 executes the state write sub-process for all the states to be written, the write control unit 150 terminates the data reception sub-process.

Figure 14:
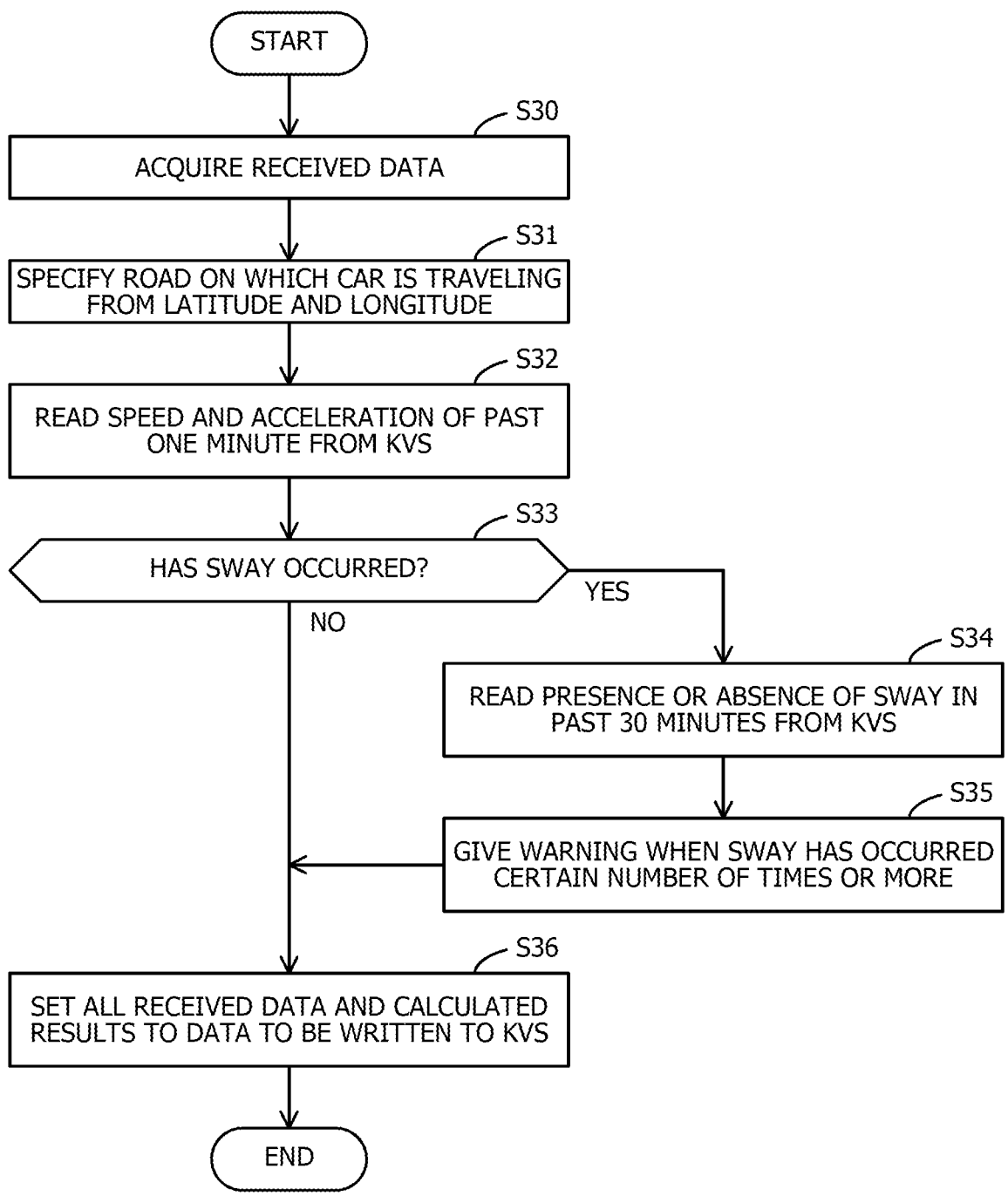
FIG. 14 is a flowchart illustrating an example of processing by a user logic.

FIG. 14 is a flowchart illustrating an example of processing by a user logic.

The processing by a user logic corresponds to step S22. Hereinafter, an example of processing by a certain user logic will be exemplified, but other user logics such as the user logics 133, 134, and 135 also perform processing according to the processing by the other user logics.
- (S30) The user logic acquires received data. The received data corresponds to the event data received by the data reception unit 131.
- (S31) The user logic specifies a road on which the connected car that has transmitted the event data is traveling from latitude and longitude information included in the received data.
- (S32) The user logic reads speed and acceleration data for the past 1 minute from the KVS 110 via the read control unit 140.
- (S33) The user logic determines whether the appropriate connected car has swayed based on changes in the speed and acceleration for the past 1 minute. In the case where sway has occurred, the processing proceeds to step S34. In the case where sway has not occurred, the processing proceeds to step S36.
- (S34) The user logic reads data regarding the presence or absence of sway for the past 30 minutes from the KVS 110 via the read control unit 140.
- (S35) The user logic notifies the connected car of a warning via the data transmission unit 136 in the case where sway has occurred a certain number of times or more based on the number of occurrences of sway for the past 30 minutes.
- (S36) The user logic sets all the received data and the determination result of the presence or absence of sway calculated in step S33 as data to be written to the KVS 110. Then, the processing by the user logic ends.

Figure 15:
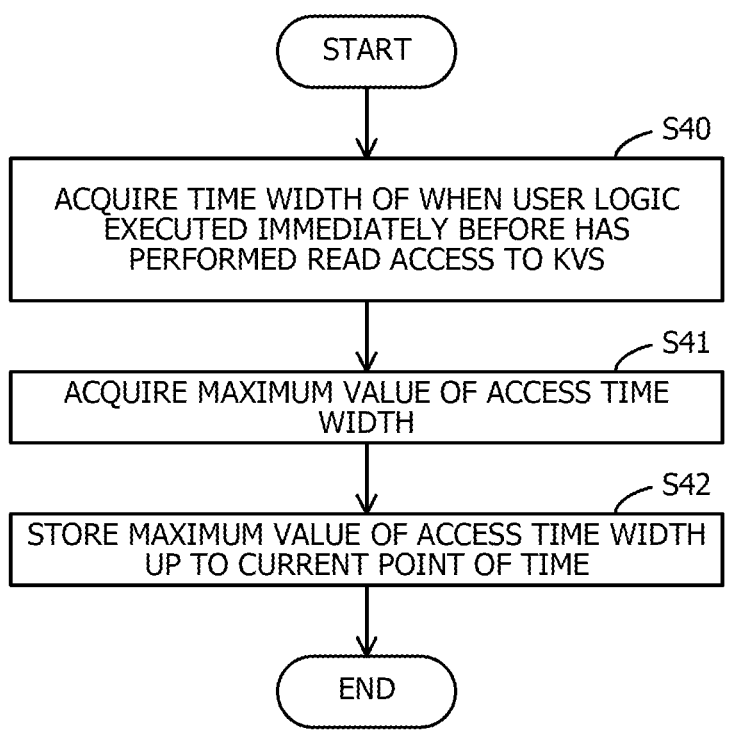
FIG. 15 is a flowchart illustrating an example of an access pattern acquisition sub-process.

FIG. 15 is a flowchart illustrating an example of the access pattern acquisition sub-process.

The access pattern acquisition sub-process corresponds to step S24.
- (S40) The access pattern acquisition unit 142 acquires the time width (access time width) of when the user logic executed immediately before has performed the read access to the KVS 110. The access time width is acquired for each state.
- (S41) The access pattern acquisition unit 142 acquires the maximum value of the access time width. The maximum value of the access time width is acquired for each state.
- (S42) The access pattern acquisition unit 142 stores the maximum value of the access time width up to the current point of time. The maximum value of the access time width up to the current point of time is stored in the access width maximum value information 122 for each appropriate object and state. For example, in the case where the appropriate object has the states of speed, position, and presence/absence of occurrence of sway, the access width maximum value information 122 is also stored in the control information storage unit 120 for each of the speed, position, and presence/absence of occurrence of sway of the appropriate object. Then, the access pattern acquisition sub-process ends.

Figure 16:
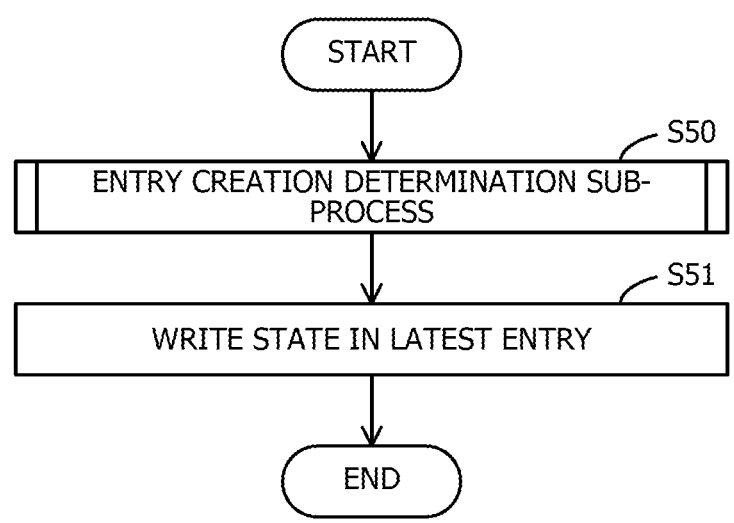
FIG. 16 is a flowchart illustrating an example of a state write sub-process.

FIG. 16 is a flowchart illustrating an example of the state write sub-process.

The state write sub-process corresponds to step S27.
- (S50) The write control unit 150 executes an entry creation determination sub-process. Details of the entry creation determination sub-process will be described below.
- (S51) The write control unit 150 writes the state to the latest entry of the KVS 110. Data of the state referred to here is, for example, the latest data of each state to be written in step S36 in the case of the processing by the user logic in FIG. 14. Furthermore, the latest entry is the latest entry corresponding to the object name and the state name of the appropriate connected car in the KVS 110. For example, for the latest entry of the state corresponding to the presence or absence of occurrence of sway, a value including the determination result of the presence or absence of occurrence of sway and the current time is registered. The state write sub-process then ends.

Figure 17:
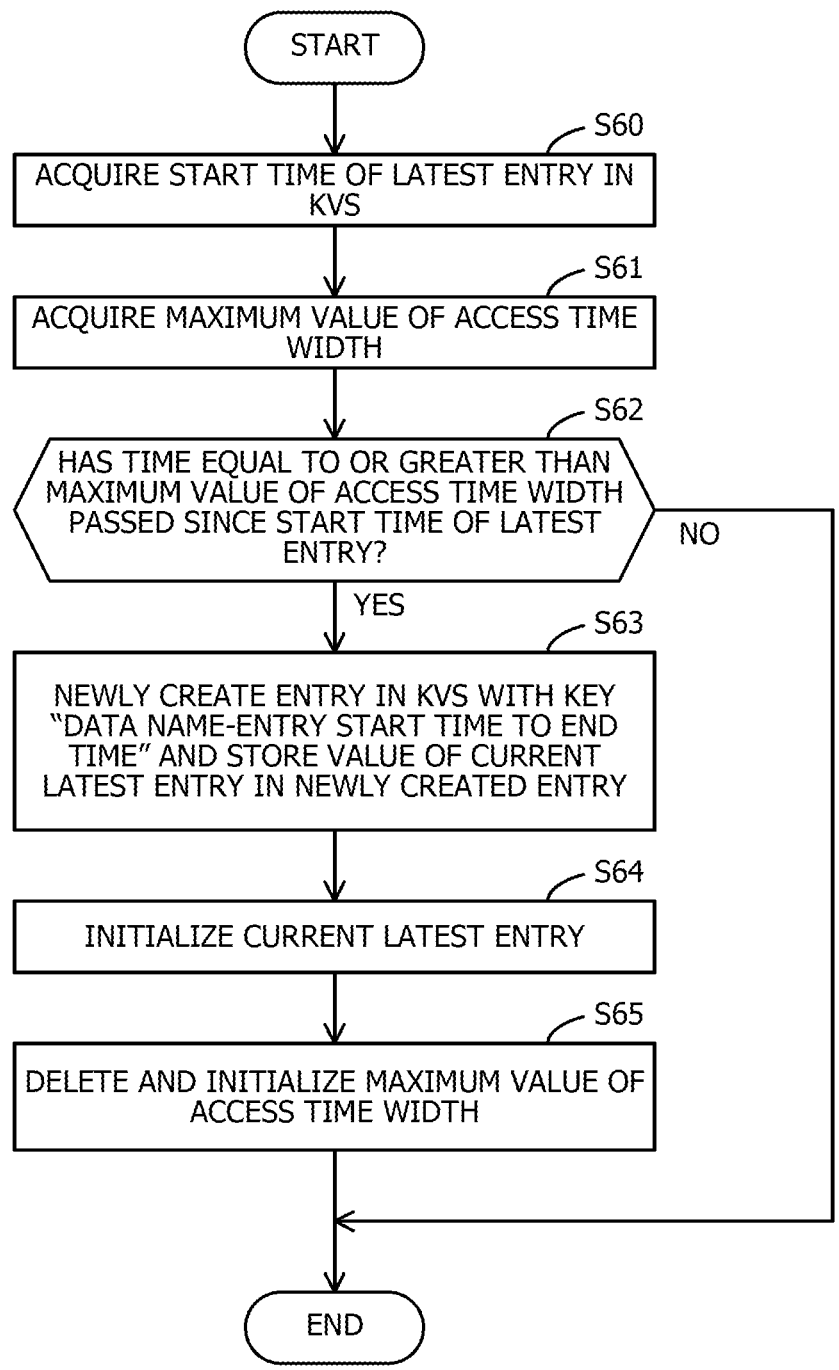
FIG. 17 is a flowchart illustrating an example of an entry creation determination sub-process.

FIG. 17 is a flowchart illustrating an example of the entry creation determination sub-process.

The entry creation determination sub-process corresponds to step S50.

(S60) The entry creation determination unit 151 acquires the start time of the latest entry of the KVS 110 corresponding to the object and state corresponding to the event data of this time.

(S61) The entry creation determination unit 151 acquires the maximum value of the access time width based on the access width maximum value information 122 corresponding to the appropriate object and state.

(S62) The entry creation determination unit 151 determines whether a time equal to or greater than the maximum value of the access time width has passed since the start time of the latest entry corresponding to the appropriate object and state. In the case where the time has passed, the processing proceeds to step S63. In the case where the time has not passed, the entry creation determination sub-process ends.

(S63) The entry creation unit 152 newly creates an entry of the KVS 110 with the key "data name-entry start time to end time", and stores the value of the current latest entry corresponding to the appropriate object and state in the newly created entry. Here, the key "data name" corresponds to "object name-state name". The entry creation unit 152 writes the newly created entry to the KVS 110 via the KVS write unit 153.

(S64) The entry creation unit 152 initializes the current latest entry corresponding to the appropriate object and state via the KVS write unit 153.

(S65) The entry creation determination unit 151 deletes and initializes the maximum value of the access time width in the access width maximum value information 122 corresponding to the appropriate object and state. Then, the entry creation determination sub-process ends.

In this way, the information processing device 100 determines the longest access time width among the read access time widths for the KVS 110 as the time width to be associated with one entry in the KVS 110.

Figure 18:
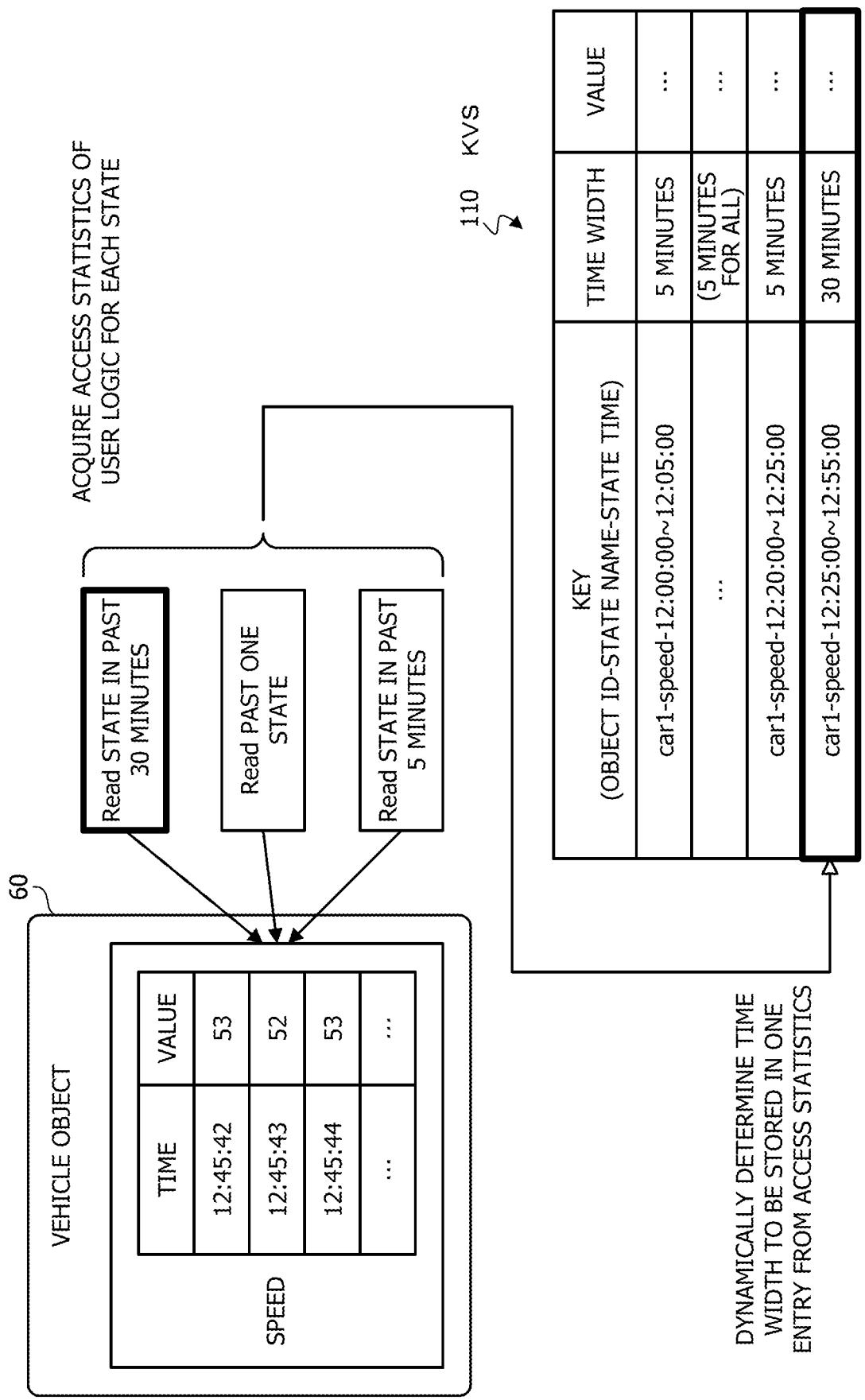
FIG. 18 is a diagram illustrating an example of determining a time width of an entry.

FIG. 18 is a diagram illustrating an example of determining the time width of an entry.

The entry creation determination unit 151 determines the time width of the entry for the state "speed" of the vehicle object 60 with the object name "car1" based on access statistics as follows, for example. Note that, in the figure, the item of "time width" is described between "key" and "value" in the KVS 110 to make it easier to understand the time width corresponding to the entry, but the KVS 110 does not need to have the item "time width".

According to the access statistics up to 12:25, the longest access time width for the KVS 110 has been 5 minutes, so the entry creation determination unit 151 determines the time width of one entry in the KVS 110 to be 5 minutes. Therefore, the entry creation unit 152 creates entries at intervals of 5 minutes until 12:25 and stores the entries in the KVS 110 via the KVS write unit 153.

Meanwhile, in the access statistics at and after 12:30, it is assumed that the longest access time width has changed to 30 minutes. Then, the entry creation determination unit 151 determines the time width of one entry in the KVS 110 to be 30 minutes. Therefore, the entry creation unit 152 creates entries at intervals of 30 minutes at and after 12:30 and stores the entries in the KVS 110 via the KVS write unit 153.

In this way, the information processing device 100 acquires the access statistics of the user logic for each state of the vehicle object 60, and dynamically determines the time width to be stored in one entry from the access statistics.

Thereby, the information processing device 100 can reduce the number of reads. For example, after the read request for the time width of 30 minutes has occurred, there is a high possibility that the read request for the time width of 30 minutes will continue to occur thereafter. Therefore, the information processing device 100 will be able to read the requested entry from the KVS 110 with a relatively small number of reads even in a case of accepting the read request with the longest time width in the future by setting the time width of one entry to the longest time width. Therefore, the information processing device 100 can speed up the read of entries from the KVS 110.

Third Embodiment

Next, a third embodiment will be described. Matters different from the above-described second embodiment will be mainly described, and description of common matters will be omitted.

In the third embodiment, an information processing device 100 determines a time width to be associated with one entry in the KVS 110 based on an access pattern table.

FIG. 19 is a diagram illustrating an example of an access pattern table according to the third embodiment.

An access pattern table 124 is information indicating candidates for the time width previously specified for one entry in the KVS 110. The access pattern table 124 is stored in a control information storage unit 120 in advance. The access pattern table 124 includes items of access pattern name, entry width, and condition for an access time width w.

In the item of access pattern name, an access pattern name that is a name of the access pattern is registered. In the item of entry time width, the time width to be associated with one entry in the KVS 110 is registered. In the item of condition for an access time width W, a condition of the access pattern corresponding to the appropriate access pattern name is registered.

For example, the access pattern table 124 has a record with the access pattern name "A", the entry time width "1 minute", and the condition for the access time width w "w<1 minute". This record corresponds to a case where the access time width w of the access pattern with the access pattern name "A" is less than 1 minute, and indicates that the time width of one entry in the KVS 110 is 1 minute.

Furthermore, the access pattern table 124 has a record with the access pattern name "B", the entry time width "5 minutes", and the condition for the access time width w "1 minute≤w<5 minutes". This record corresponds to a case where the access time width w of the access pattern with the access pattern name "B" is 1 minute or longer and less than 5 minutes, and indicates that the time width of one entry in the KVS 110 is 5 minutes.

Furthermore, the access pattern table 124 has a record with the access pattern name "C", the entry time width "15 minutes", and the condition for the access width w "5 minutes≤w<15 minutes". This record corresponds to a case where the access time width w of the access pattern with the access pattern name "C" is 5 minutes or longer and less than 15 minutes, and indicates that the time width of one entry in the KVS 110 is 15 minutes.

Furthermore, the access pattern table 124 has a record with the access pattern name "D", the entry time width "30 minutes", and the condition for the access time width w "15 minutes≤w". This record corresponds to a case where the access time width w of the access pattern with the access pattern name "D" is 15 minutes or longer, and indicates that the time width of one entry in the KVS 110 is 30 minutes.

Note that, according to the access pattern table 124, a minimum value of the entry time width is "1 minute" and a maximum value of the entry time width is "30 minutes". In the third embodiment, the control information storage unit 120 does not hold a time width threshold table 121.

Thus, in the third embodiment, several patterns of time width candidates are determined in advance as the time width to be associated with one entry. The time width to be stored in one entry of the KVS 110 is selected from these several patterns. Selection methods include the following first and second methods.

The first method is a method for counting the time widths of recent read accesses by user logics for each access pattern according to classification of the access pattern table 124, and setting the time width corresponding to the longest access pattern as the time width of one entry.

The second method is a method for excluding access patterns with the number of occurrences less than a certain percentage among the counted access patterns from the selection candidates, and setting the time width corresponding to the longest access pattern among the access patterns with the number of occurrences equal to or greater than the certain percentage as the time width of one entry.

By using the second method, it is possible to reduce a frequency of reading extra information longer than the time width from the KVS 110 for the read access with a relatively short time width, compared to the first method.

FIG. 20 is a diagram illustrating an example of entries in KVS according to access patterns.

A KVS entry group 116 is an example of entries in the KVS 110 for the object name "car1" and the state name "speed". In the access pattern table 124, 1 minute, 5 minutes, 15 minutes, and 30 minutes are defined in advance as specified values of the time width. Therefore, the time to be associated with each entry in the KVS entry group 116 is 1 minute, 5 minutes, 15 minutes, or 30 minutes.

FIG. 21 is a table illustrating an example of state accesses of user logics.

Table 53 illustrates an example of state accesses by four user logics executed by the information processing device 100. It is assumed that the state to be accessed is speed. Note that, in the example of the third embodiment, it is assumed that a value corresponding to the state "speed" in the KVS 110 also includes position information. Note that the information processing device 100 does not have to have information corresponding to the table 53.

In the table 53, items of name of the user logics and content of the user logics. Description of each item is the same as in the table 51.

For example, the content of the user logic "a" is to acquire the speed at current time. The content of the user logic "b" is to acquire the speed in the last 3 minutes. The content of the user logic "c1" is to acquire the speed and position of the last 15 minutes, in a case where the position has been updated. The content of the user logic "d" is to acquire the speed of the last 60 minutes once an hour.

FIG. 22 is a diagram illustrating an example of access history information.

Access history information 123*a* indicates a history of the read accesses of the state "speed" of the appropriate object every second from initial time 12:00:00 by the user logics "a", "b", "c1", and "d". An access pattern acquisition unit 142 is only required to acquire the time width of access by each user logic at each time. Therefore, the access history information 123*a* expresses the access history in an easy-to-understand manner, and does not have to be stored in the control information storage unit 120.

Description of each item of the access history information 123*a* is the same as that of the access history information 123. Note that the access history information 123*a* includes "c1" and "d" as target user logics.

For example, at the time 12:00:00, the following read accesses occur. The first read access is the read access of "speed-12:00:00(0)" by the user logic "a". The second read access is the read access of "speed-11:57:00 to 12:00:00 (3 minutes)" by the user logic "b". The third read access is the read accesses of "speed-11:50:00 to 12:00:00 (10 minutes)" and "position-11:50:00 to 12:00:00 (10 minutes)" by the user logic "c1". The fourth read access is the read access of "speed-11:00:00 to 12:00:00 (60 minutes)" by the user logic "d".

Furthermore, at the time 12:00:01, the next read accesses occur. The first read access is the read access of "speed-12:00:01(0)" by the user logic "a". The second read access is the read access of "speed-11:57:01 to 12:00:01 (3 minutes)" by the user logic "b". The third read access is the read accesses of "speed-11:50:01 to 12:00:01 (10 minutes)" and "position-11:50:01 to 12:00:01 (10 minutes)" by the user logic "c1". Note that no read access by the user logic "d" occurs from the time 12:00:01 to 12:59:59.

FIG. 23 is a diagram illustrating an example of a KVS entry.

A KVS entry 117 is an example of the latest entry for the object name "car1" and the state name "speed". For example, the KVS entry 117 indicates the latest entry of the KVS 110 immediately after the start of processing at time 12:00:00 (for example, at the point of time about 1 to 2 minutes have passed). The time width for one entry is 1 minute for a shortest. In the example of the KVS entry 117, the time width of one entry is undetermined because the read access with the time width of 1 minute or longer has occurred within 1 minute from the start time ("12:00:00") of the latest entry. In the figure, the undetermined is represented by "??".

Figure 24:
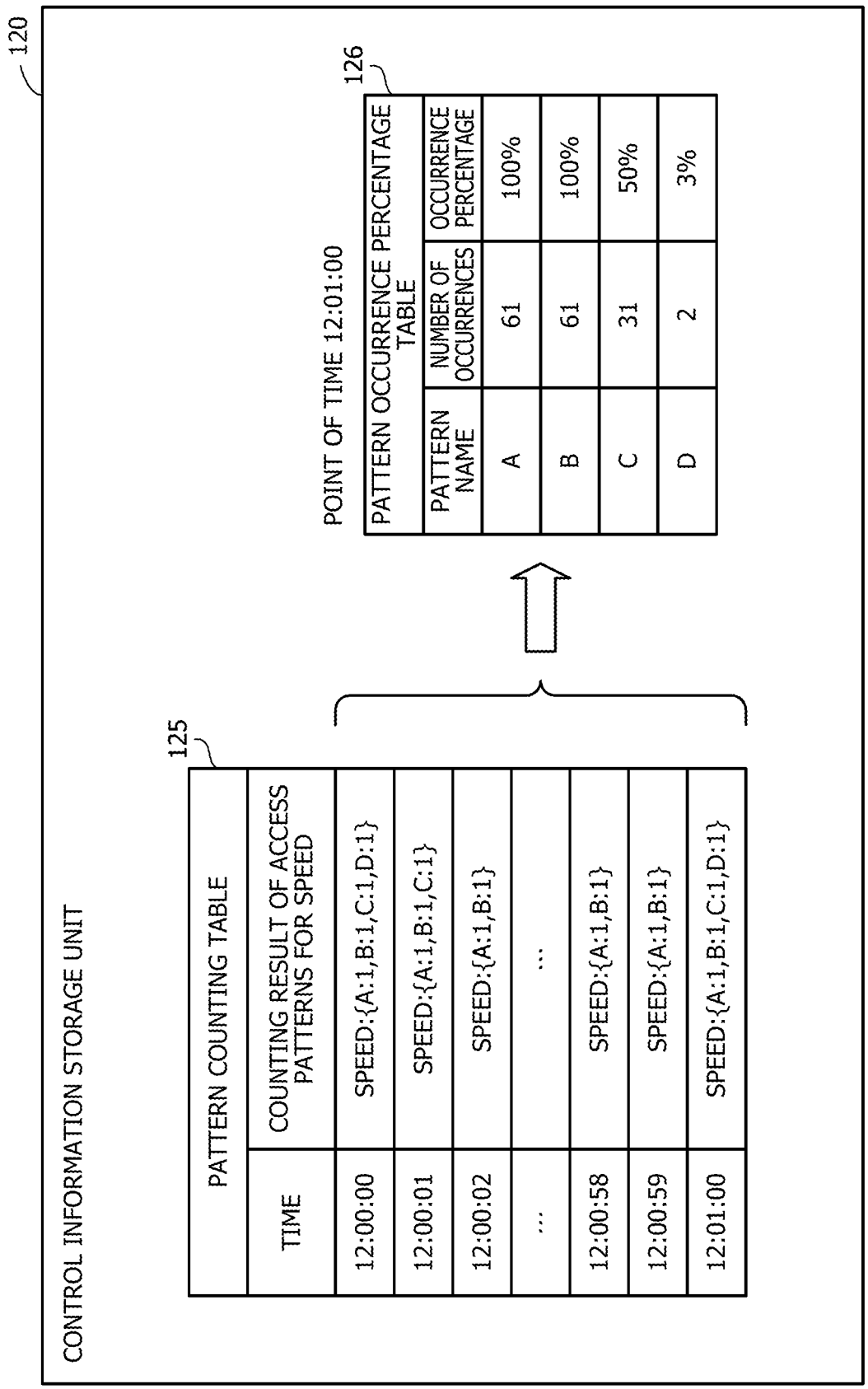
FIG. 24 is a diagram illustrating an example of counting access patterns.

FIG. 24 is a diagram illustrating an example of counting access patterns.

In the third embodiment, the information processing device 100 has a pattern counting table 125 and a pattern occurrence percentage table 126 instead of access width maximum value information 122. The pattern counting table 125 and the pattern occurrence percentage table 126 are generated by an access pattern acquisition unit 142 and an entry creation determination unit 151, respectively, and stored in the control information storage unit 120.

In the pattern counting table 125, a counting result of access patterns of the read accesses that have occurred at each time for a certain state of a certain object is recorded. In the pattern occurrence percentage table 126, the entry creation determination unit 151 registers the occurrence percentage of each access pattern from the start time of the latest entry to the current time. Here, the occurrence percentage is a percentage of occurrence of the appropriate access pattern with respect to a total number of records in the pattern counting table 125.

For example, it is assumed that the pattern counting table 125 indicates a counting result of the access patterns for the speed state of the appropriate object. The access pattern for a read request is specified based on a condition of an access time width w in the access pattern table 124. As an example, in the pattern counting table 125, a counting result of the access patterns for speeds every second from 12:00:00 is recorded.

For example, the pattern counting table 125 has a record of the time "12:00:00" and the counting result "speed: {A:1, B:1, C:1, D:1}" of the access patterns for the speed. This record indicates that at the time 12:00:00, the access pattern "A" has occurred once, "B" has occurred once, "C" has occurred once, and "D" has occurred once. Similarly, in the pattern counting table 125, records from the time "12:00:00" to "12:01:00" are recorded. Note that, in a case where no read access with the appropriate access pattern has not been observed at certain time, the number of occurrences of the access pattern is 0, but the record of 0 is omitted in the pattern counting table 125.

The pattern occurrence percentage table 126 indicates the number of occurrences and the occurrence percentage of each access pattern at the point of time of the time 12:01:00. For example, the number of occurrences of the access pattern "A" is 61, and the occurrence percentage is 61/61*100=100%. The number of occurrences of the access pattern "B" is 61, and the occurrence percentage is 61/61*100=100%. The number of occurrences of the access pattern "C" is 31, and the occurrence percentage is 31/61*100=50%. The number of occurrences of the access pattern "D" is "2", and the occurrence percentage is 2/61*100=3%.

According to the pattern occurrence percentage table 126 at the point of time 12:01:00, it is known that the access patterns "B" with the width of 5 minutes, "C" with the width of 15 minutes, and the like have also occurred in addition to the access pattern "A" with the width of 1 minute. Therefore, the write control unit 150 determines to store data of or after 12:01:00 in the latest entry from 12:00:00.

Therefore, the write control unit 150 does not newly create an entry at the point of time 12:01:00, but continues to store data in the latest entry of 12:00:00. Candidates for the time width of the entry are the access pattern "A" of 1 minute followed by the access pattern "B" of 5 minutes. Therefore, the write control unit 150 stores the data from 12:00:00 to 12:04:59 as is in the latest entry. That is, the write control unit 150 performs processing as usual until data of 12:05:00 arrives, and determines whether to store the data of or after 12:05:00 in the latest entry when data of 12:05:00 has arrived.

Figure 25:
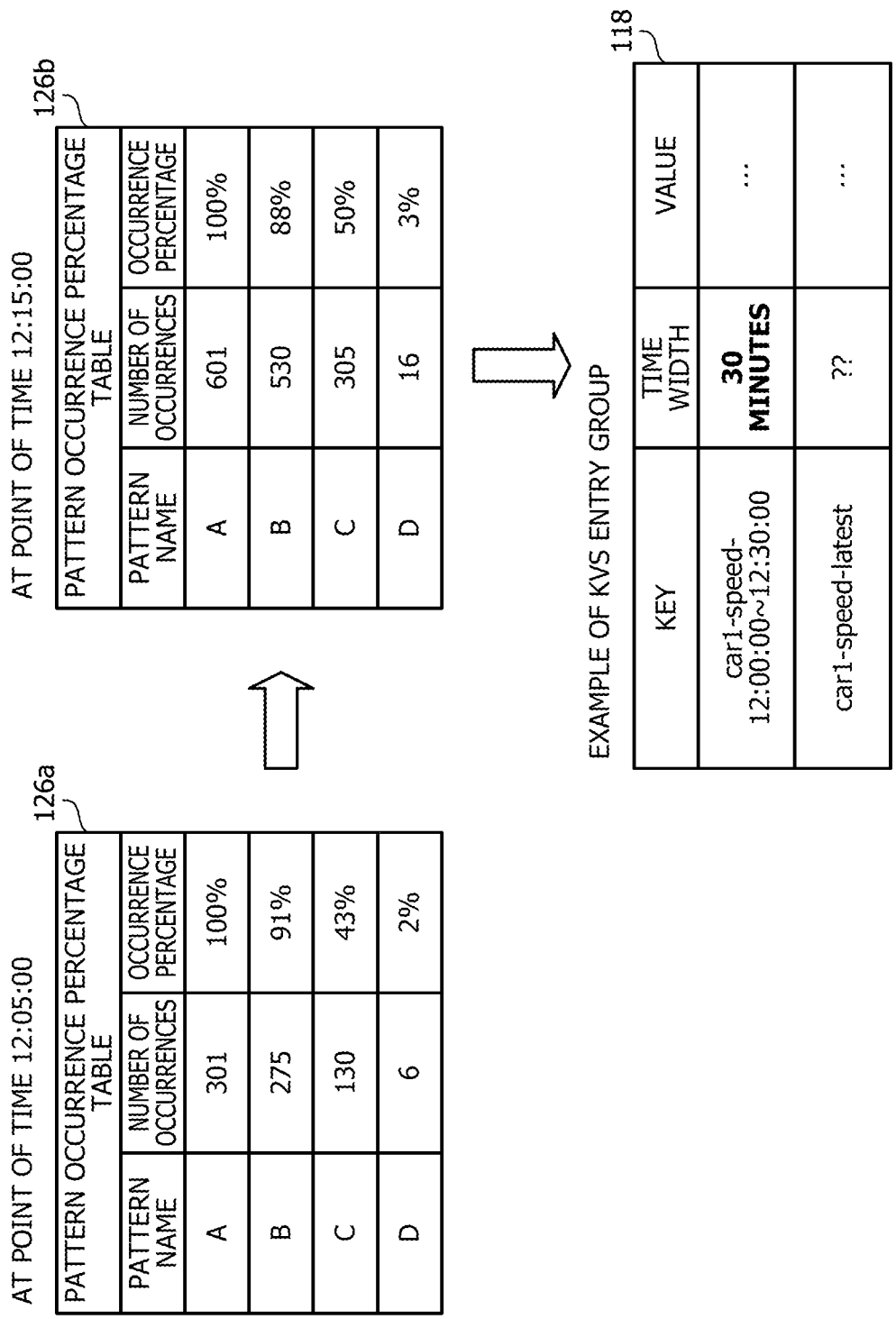
FIG. 25 is a diagram illustrating an example of creating a KVS entry.

FIG. 25 is a diagram illustrating an example of creating a KVS entry.

The access pattern acquisition unit 142 creates a pattern occurrence percentage table 126*a* at the point of time 12:05:00. Since the access pattern "C" with the width of 15 minutes and the like have occurred, similarly to the determination at 12:01:00, the write control unit 150 does not newly create the entry at 12:05:00 and ongoingly stores the data in the latest entry that has started at 12:00:00. The write control unit 150 performs determination again when the time width of 15 minutes of the next access pattern "C" has passed from the start time of the latest entry.

The access pattern acquisition unit 142 creates a pattern occurrence percentage table 126*b* at the point of time 12:15:00. Since the access pattern "D" has the longest access time width, it is assumed that the write control unit 150 determines the time width to be associated with one entry in the KVS 110 to be 30 minutes corresponding to the access pattern "D" based on the pattern occurrence percentage table 126*b*.

Thereafter, the write control unit 150 writes data to the latest entry until 12:29:59. For example, after the data of 12:29:59 is processed, the write control unit 150 creates an entry for storing the data from 12:00:00 to 12:29:59, copies the content of the latest entry to the newly created entry and initializes the latest entry. The key of the entry for storing the data from 12:00:00 to 12:29:59 is "carl-speed-12:00:00 to 12:30:00". The write control unit 150 stores subsequent data in the latest entry. A KVS entry group 118 indicates an example of the entries stored in the KVS 110 at this point of time. Furthermore, the write control unit 150 also initializes the pattern counting table and pattern occurrence table at this point of time (deletes all the records).

Note that the example of creating an entry in FIG. 25 is based on the first method described in FIG. 19. Meanwhile, the write control unit 150 may create an entry based on the second method. For example, in a case of excluding the access patterns with the occurrence percentage of less than 30% from the selection candidates, the access pattern "D" is excluded from the selection candidates and the access patterns "A" to "C" are the selection candidates at 12:15:00. In this case, the write control unit 150 adopts the entry time width of the access pattern "C". That is, at the point of time 12:15:00, the write control unit 150 creates an entry from 12:00:00 to 12:15:00, copies the content of the latest entry, and initializes the latest entry.

Next, a processing procedure of the information processing device 100 according to the third embodiment will be described. The third embodiment differs from the second embodiment in procedures of an access pattern acquisition sub-process and an entry creation determination sub-process. Other procedures are the same as those of the second embodiment, so description thereof will be omitted.

Figure 26:
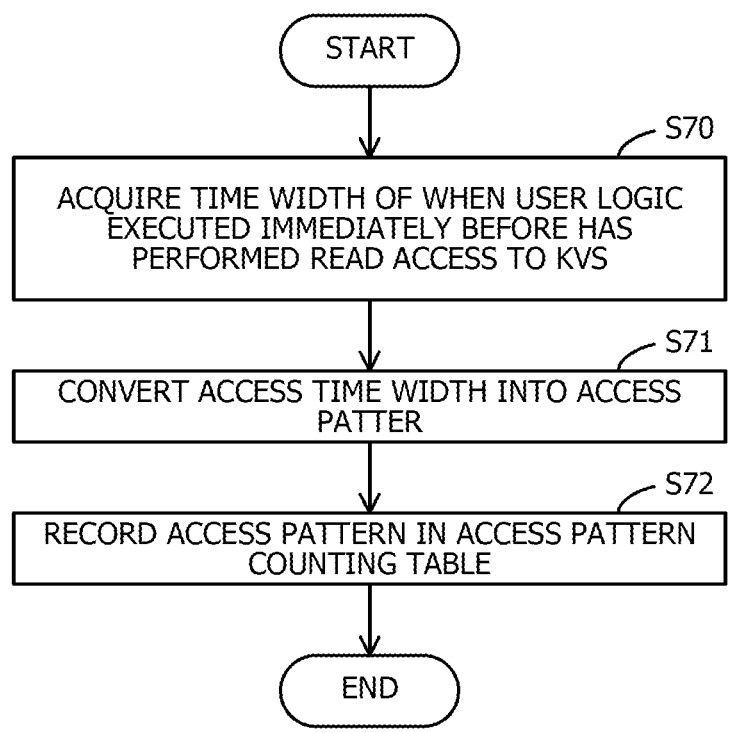
FIG. 26 is a flowchart illustrating an example of an access pattern acquisition sub-process.

FIG. 26 is a flowchart illustrating an example of the access pattern acquisition sub-process.

The access pattern acquisition sub-process corresponds to step S24.

(S70) The access pattern acquisition unit 142 acquires the time width (access time width) of when the user logic executed immediately before has performed the read access to the KVS 110. The access time width is acquired for each state of an object corresponding to received event data.

(S71) The access pattern acquisition unit 142 converts the access time width into the access pattern based on the access pattern table 124.

(S72) The access pattern acquisition unit 142 records the converted access pattern in the pattern counting table 125. Then, the access pattern acquisition sub-process ends.

Figure 27:
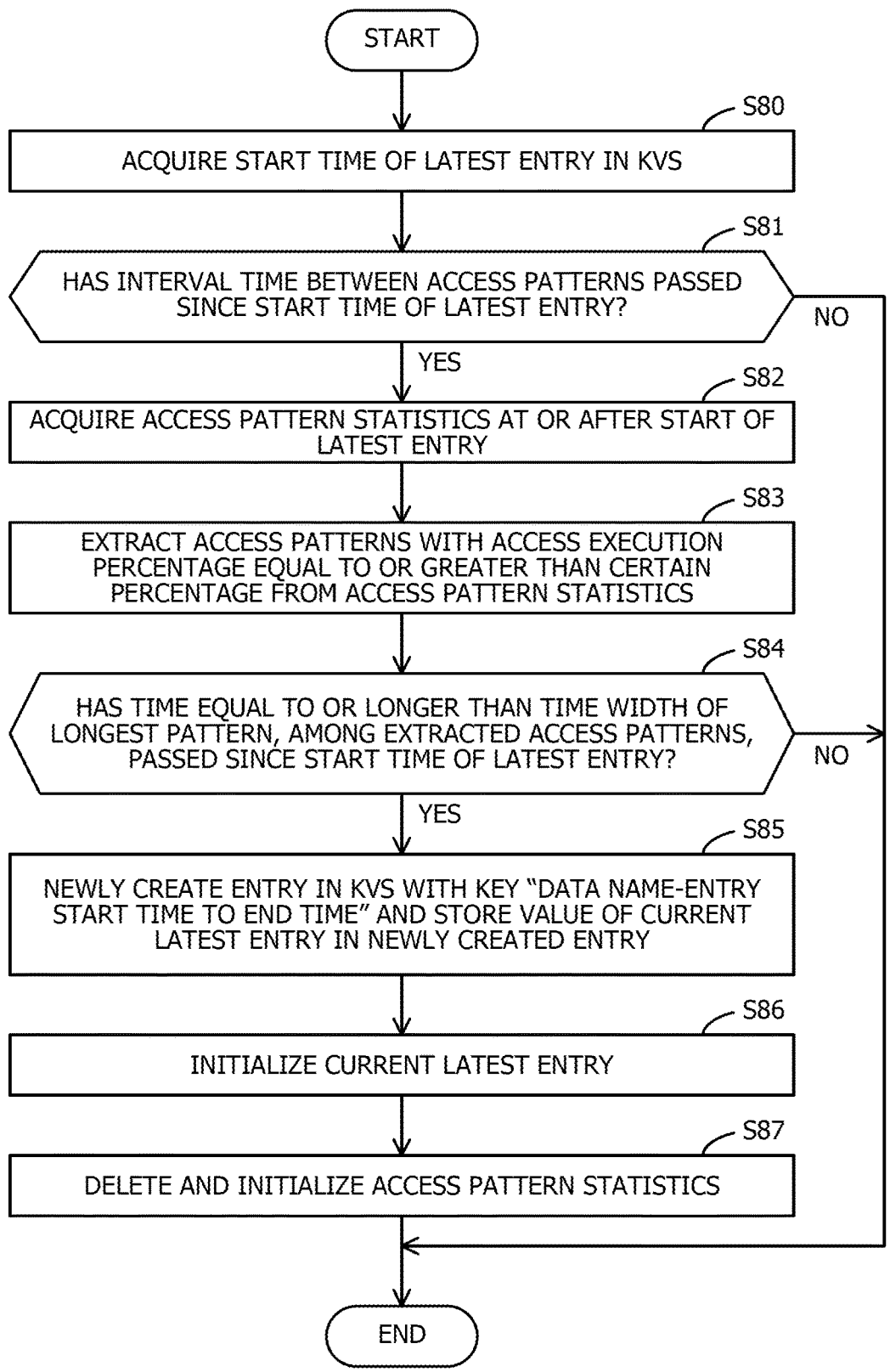
FIG. 27 is a flowchart illustrating an example of an entry creation determination sub-process.

FIG. 27 is a flowchart illustrating an example of the entry creation determination sub-process.

The entry creation determination sub-process corresponds to step S50.

(S80) The entry creation determination unit 151 acquires the start time of the latest entry of the KVS 110 corresponding to the object and state corresponding to the event data of this time.

(S81) The entry creation determination unit 151 determines whether an interval time between access patterns has passed since the start time of the latest entry. In a case where the interval time has passed, the processing proceeds to step S82. In a case where the interval time has not passed, the entry creation determination sub-process ends. Here, in the example of the access pattern table 124, the interval time between the access patterns "A" and "B" is 1 minute. Furthermore, the interval time between the access patterns "B" and "C" is 5 minutes. The interval time between the access patterns "C" and "D" is 15 minutes. Furthermore, the longest entry time width of 30 minutes in the access pattern table 124 is also one interval time.

(S82) The entry creation determination unit 151 acquires access pattern statistics at or after the start of the latest entry, that is, the pattern occurrence percentage table 126, based on the pattern counting table 125.

(S83) The entry creation determination unit 151 extracts the access patterns with an access execution percentage equal to or greater than a certain percentage from the acquired access pattern statistics. That is, the entry creation determination unit 151 extracts the access patterns with the occurrence percentage (access execution percentage) equal to or greater than a certain percentage from the pattern occurrence percentage table 126. Note that in the case of using the first method, the certain percentage=0 may be set. In the case of using the second method, the certain percentage is determined in advance, such as the certain percentage=30%. Furthermore, in the case of using the second method, in step S83, it is conceivable that there is no access pattern with the occurrence percentage equal to or greater than the certain percentage. In that case, the entry creation determination unit 151 may extract all the access patterns recorded in the pattern occurrence percentage table 126 based on the first method.

(S84) The entry creation determination unit 151 determines whether a time equal to or longer than the time width of the longest pattern among the access patterns extracted in step S83 has passed since the start time of the latest entry corresponding to the appropriate object and state. The longest pattern indicates the longest access pattern among the access patterns extracted in step S83. The time width of the longest pattern is the entry time width corresponding to the longest pattern in access pattern table 124. In the case where the time equal to or longer than the time width of the longest pattern has passed, the processing proceeds to step S85. In the case where the time equal to or longer than the time width of the longest pattern has not passed, the entry creation sub-process ends.

(S85) The entry creation unit 152 newly creates an entry in the KVS 110 with the key "data name-entry start time to end time", and stores the value of the current latest entry corresponding to the appropriate object and state in the newly created entry. Here, the key "data name" corresponds to "object name-state name". The entry creation unit 152 writes the newly created entry to the KVS 110 via the KVS write unit 153.

(S86) The entry creation unit 152 initializes the current latest entry corresponding to the appropriate object and state via the KVS write unit 153.

(S87) The entry creation determination unit 151 deletes and initializes the access pattern statistics corresponding to the appropriate object and state. Specifically, the entry creation determination unit 151 deletes and initializes all the records of the pattern counting table 125 and the pattern occurrence percentage table 126. Then, the entry creation determination sub-process ends.

As described above, the information processing device 100 counts the access patterns that have occurred, based on the access pattern table 124, and creates the pattern occurrence percentage table 126. The information processing device 100 then sets the entry time width corresponding to the longest access pattern as the time width to be associated with one entry in the KVS 110. For example, in the case of 15 minutes≤w<30 minutes in the w conditions of the access patterns "A" to "C" and the access pattern "D" in the access pattern table 124, the entry time width is determined to become longer than the access time width w corresponding to the access patterns. In this way, the information processing device 100 may set the time width longer than the actually requested access time width as the time width to be associated with one entry. Thereby, the information processing device 100 can reduce the number of reads from the KVS 110.

Furthermore, as indicated by the access pattern "D", an upper limit may be provided for the entry time width. In this case, the information processing device 100 can control the time width of one entry to be 30 minutes even if the access time width w is 30 minutes or longer. Therefore, the information processing device 100 can limit an amount of data in one entry so as not to become too large.

Furthermore, the information processing device 100 can suppress adoption of an inappropriate time width by excluding the entry time width corresponding to the access patterns with the occurrence percentage less than the certain percentage from the selection candidates based on the pattern occurrence percentage table 126. For example, the access pattern that has occurred only a few times may be an access pattern that has occurred randomly, and may not be highly likely to occur continuously in the future. In such a case, the information processing device 100 can suppress the entry time width from being determined based on the access pattern that has randomly occurred.

In particular, if the entry time width is determined based on an infrequent long-time access, extra data will be read over a relatively long time width at the time of a read access with a relatively short time width, resulting in extra read costs. The information processing device 100 can reduce the possibility of extra read costs by ignoring the access patterns with the occurrence percentage lower than the certain percentage.

Hereinafter, modifications of the third embodiment will be described as fourth to sixth embodiments.

Fourth Embodiment

Next, a fourth embodiment will be described. Matters different from the above-described second and third embodiments will be mainly described, and description of common matters will be omitted.

Figure 28:
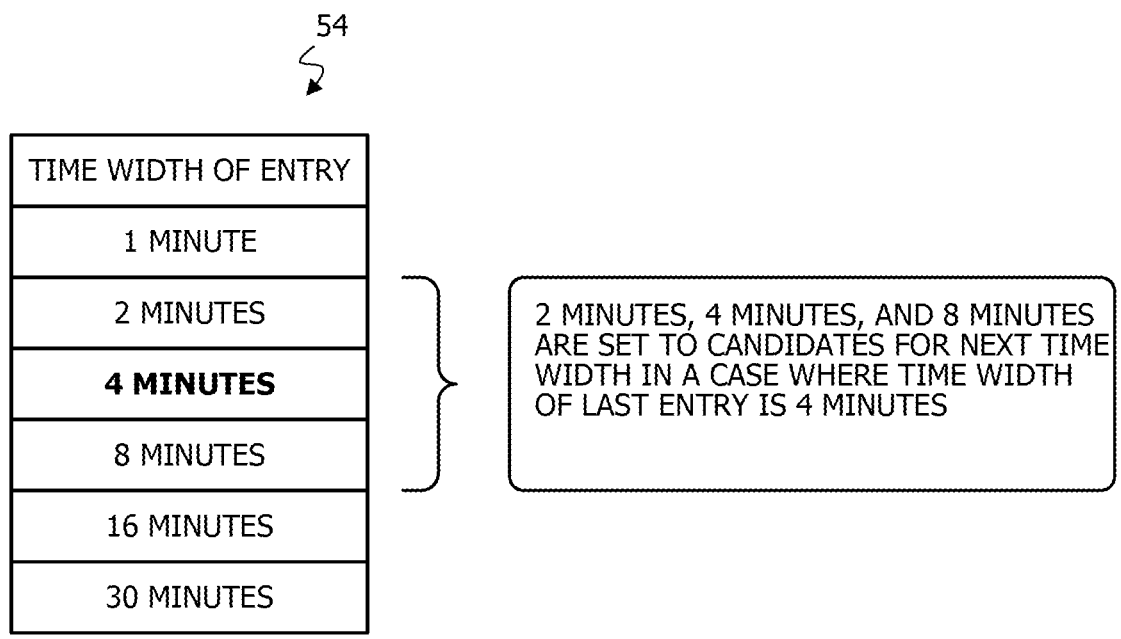
FIG. 28 is a diagram illustrating an example of time widths of entries according to a fourth embodiment.

FIG. 28 is a diagram illustrating an example of time widths of entries according to the fourth embodiment.

An entry creation determination unit 151 may simplify access pattern determination and access pattern counting according to an access time width as follows. Specifically, the entry creation determination unit 151 determines access patterns targeted for the access pattern determination up to access patterns corresponding the time width of a most recently created entry and one time width before and one time width after the time width. Then, in a case where there are four or more access patterns, determination and counting of all the access patterns are not needed, and only three access patterns need to be processed. Therefore, efficiency of the processing can be achieved.

Furthermore, abrupt lengthening or abrupt shortening can be suppressed in changes in the entry time width. For example, the entry creation determination unit 151 can suppress a behavior of creating a short-time width entry based on short-time statistics at the time of determining the next entry after creating a long-time width entry.

For example, a list 54 illustrates candidates for the entry time widths. In the fourth embodiment, only an upper limit of the entry time width is determined in advance instead of predetermined access patterns in an access pattern table 124. Furthermore, as illustrated in the list 54, the access patterns are in units of $2^m$ minutes such as 1 minute, 2 minutes, 4 minutes. n is an integer equal to or greater than 0.

For example, in a case where the entry time width adopted immediately before is $2^m$ minutes, an access pattern acquisition unit 142 determines whether the access pattern by a user logic is "$2^m$ minutes or longer", "less than $2^{m-1}$ minutes", or "others (less than $2^m$ minutes and $2^{m-1}$ minutes or longer)". m is an integer equal to or greater than 1. Then, the access pattern acquisition unit 142 creates a pattern counting table 125 for these three access patterns.

The entry creation determination unit 151 further counts the pattern counting table 125 and creates a pattern occurrence percentage table 126 when $2^{m-1}$ minutes have passed since the start of the latest entry. At this time, in a case where the access pattern with the highest occurrence percentage is "less than $2^{m-1}$ minutes", the entry creation determination unit 151 sets the time width to be associated with an entry to $2^{m-1}$ minutes. Otherwise, the entry creation determination unit 151 waits until $2^m$ minutes pass.

The entry creation determination unit 151 counts the pattern counting table 125 again and creates the pattern occurrence percentage table 126 when $2^m$ minutes have passed since the start of the latest entry. At this time, in a case where the access pattern with the highest occurrence percentage is "less than $2^m$ minutes and $2^{m-1}$ minutes or longer", the entry creation determination unit 151 sets the time width to be associated with one entry to $2^m$ minutes. Otherwise, the entry creation determination unit 151 sets the time width to $2^{m+1}$ minutes.

Thereafter, the entry creation determination unit 151 repeatedly executes a similar procedure.

For example, it is assumed that the most recently adopted entry has the time width of 4 minutes. In this case, the candidate for the time width of the entry of this time is one of 2, 4, or 8 minutes. In a case where there are many read accesses with the time width longer than 4 minutes, the entry creation determination unit 151 determines the time width of the entry of this time to be 8 minutes. Then, when creating the entry with the time width of 8 minutes, the entry creation determination unit 151 counts the access patterns with any one of 4, 8, or 16 minutes as the candidate for the next time width.

Thereby, the information processing device 100 can improve the efficiency of the access pattern counting, and can suppress changes in the time width of entries not to become too large. Note that the shortest time width and the longest time width are predetermined (for example, 1 minute for a minimum and 30 minutes for a maximum, or the like). Furthermore, the time width of the first entry is predetermined to one of the candidates in the list 54 (for example, the shortest value of 1 minute).

Fifth Embodiment

Next, a fifth embodiment will be described. Matters different from the above-described second to fourth embodiments will be mainly described, and description of common matters will be omitted.

Figure 29:
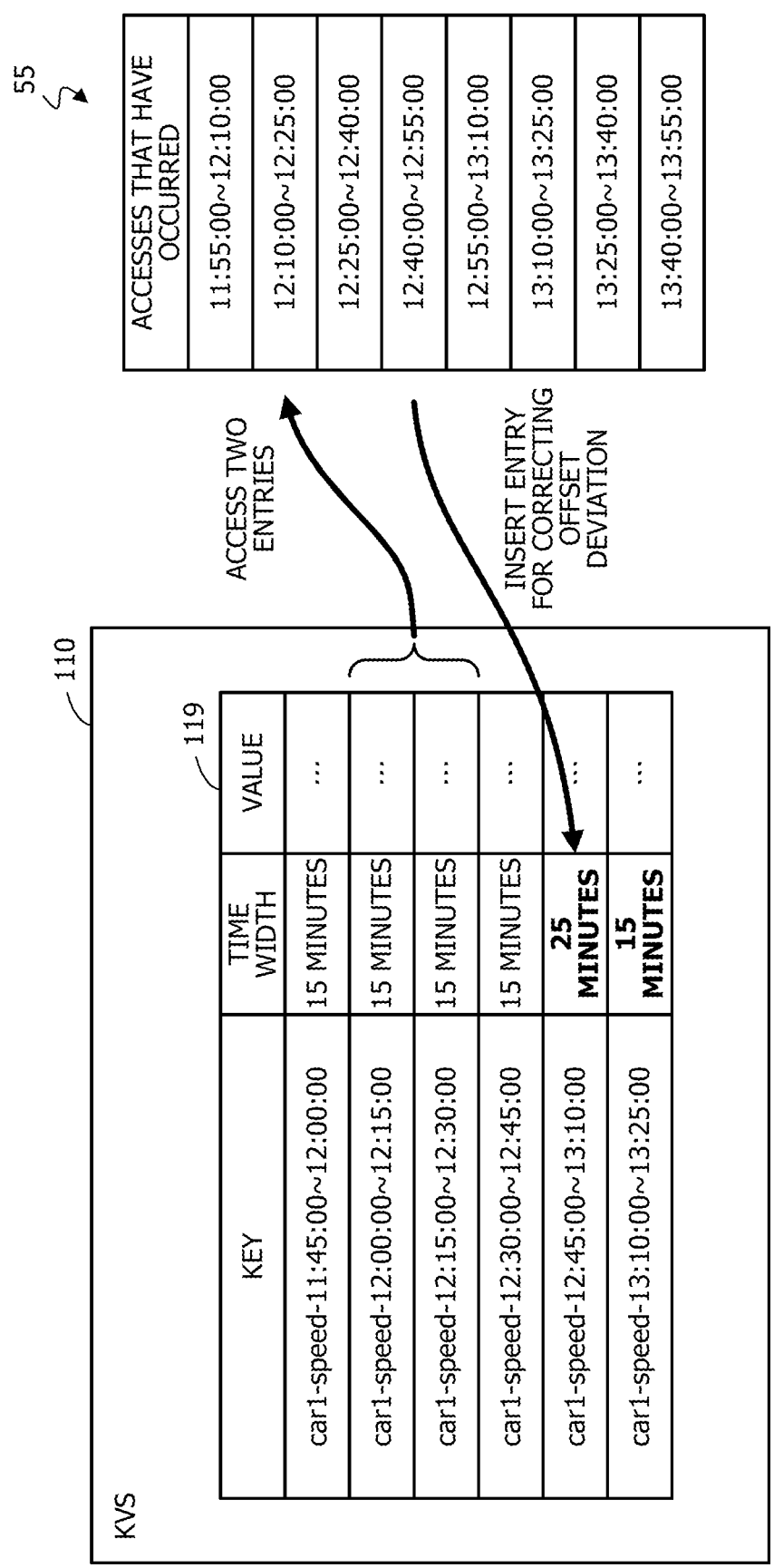
FIG. 29 is a diagram illustrating an example of correcting time offset deviation according to a fifth embodiment.

FIG. 29 is a diagram illustrating an example of correcting time offset deviation according to a fifth embodiment.

An entry creation determination unit 151 may align an offset of time of an entry with respect to time of a read access by performing control to create an entry in KVS 110 with a time width other than an entry time width corresponding to a predetermined access pattern every certain time.

A list 55 illustrates an example of read accesses that have occurred to a KVS entry group 119 of the KVS 110. The time width of each entry in the KVS entry group 119 is 15 minutes from 11:45:00 to 12:45:00. Furthermore, the time width required for each read access is 15 minutes. In this case, for example, the read access requires time range of 12:10:00 to 12:25:00. Then, a read control unit 140 accesses two entries of a key "carl-speed-12:00:00 to 12:15:00" and a key "carl-speed-12:15:00 to 12:30:00" of the KVS entry group 119.

Therefore, for example, when detecting that the read requests with the width of 15 minutes have continuously occurred for a certain time (for example, one hour) and there is a deviation in the offset, an entry creation determination unit 151 inserts an entry for correcting the offset deviation into the KVS 110. The entry for correction is created by an entry creation unit 152, and the created entry for correction is written to the KVS 110 by a KVS write unit 153.

In the above-described example, the entry creation determination unit 151 inserts the entry with a key "carl-speed-12:45:00 to 13:10:00" into the KVS 110. Thereafter, the entry creation determination unit 151 again controls the entry creation unit 152 to create an entry for the KVS 110 with the time width of 15 minutes. In this way, the entry creation determination unit 151 matches the time range specified by the read request with the time range of the entry in the KVS 110.

More specifically, the read control unit 140 and a write control unit 150 execute an offset adjustment process every certain time described below. First, an access pattern acquisition unit 142 detects that, by each user logic, a read access with an offset with respect to the time range of entries in the KVS 110 illustrated in the list 55 has occurred. The access pattern acquisition unit 142 determines whether an access time width matches an entry time width of any access pattern in an access pattern table 124. In a case where the time widths match, the time widths and the offset are stored. In a case where the time widths do not match, the access pattern acquisition unit 142 ignores the read access. For example, the access pattern acquisition unit 142 stores the read access that has occurred in the past in an executed user logic, and compares access timing and the access time width with the entry time width of the access pattern table 124, thereby to perform the above-described determination.

The entry creation determination unit 151 determines whether the time width of the entry matches the access time width illustrated in list 55 at the time of creating the entry. In the case where the time widths do not match, the entry creation determination unit 151 does nothing. In the case where the time widths match, the entry creation determination unit 151 determines whether the amount of deviation between a creation time of the entry and the offset matches a multiple of the access time width. In the case where the amount of deviation matches the multiple of the access time width, the entry creation determination unit 151 does nothing. In the case where the amount of deviation does not match the multiple of the access time width, the entry creation determination unit 151 records the amount of deviation.

Then, the entry creation determination unit 151 extends the time width of the entry at the time of creating the next entry by the recorded amount of deviation every certain time.

Thereby, an information processing device 100 can suppress occurrence of extra accesses due to the offset deviation. In the above-described example, the information processing device 100 have accessed two entries in response to the read request before correcting the offset deviation, but the information processing device only needs to access one entry in response to the read request after correcting the offset deviation. Thus, the read access is made more efficient.

Sixth Embodiment

Next, a sixth embodiment will be described. Matters different from the above-described second to fifth embodiments will be mainly described, and description of common matters will be omitted.

Figure 30:
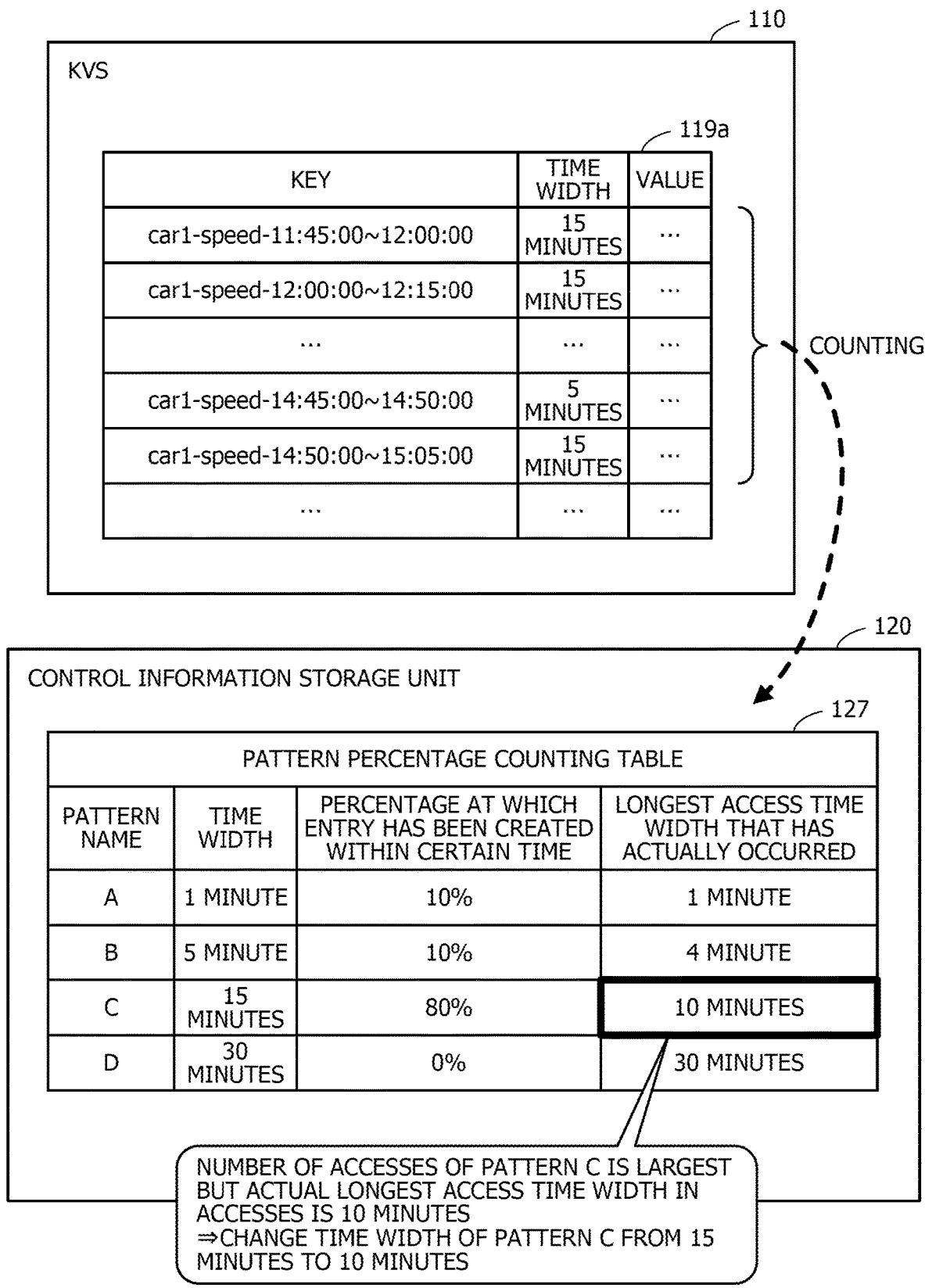
FIG. 30 is a diagram illustrating a modification of a time width of an access pattern according to a sixth embodiment.

FIG. 30 is a diagram illustrating a modification of a time width of an access pattern according to the sixth embodiment.

An entry creation determination unit 151 may adjust an entry time width corresponding to an access pattern defined in an access pattern table 124 based on an actual access time width of each access pattern.

A KVS entry group 119a illustrates an example of each entry in KVS 110 from 11:45:00 to 15:05:00. The entry creation determination unit 151 generates a pattern percentage counting table 127 based on a pattern counting table, which is a counting result of access patterns having occurred for the KVS entry group 119a, and stores the pattern percentage counting table 127 in a control information storage unit 120. As described above, the pattern counting table is generated by an access pattern acquisition unit 142, but its illustration is omitted in FIG. 30. Furthermore, the pattern percentage counting table 127 is generated instead of a pattern occurrence percentage table 126.

The pattern percentage counting table 127 holds, for each access pattern, a percentage at which entries have been created within a certain time with the access pattern and the longest access time width that has actually occurred with the access pattern.

In the example of the pattern percentage counting table 127, the percentage of entries created with an access pattern "C" is the highest at 80%. In the access pattern "C", the entry time width is 15 minutes. Meanwhile, among the read accesses determined to have the access pattern "C", the longest access time width that has actually occurred is 10 minutes. Therefore, the entry creation determination unit 151 changes the time width of the access pattern "C" from 15 minutes to 10 minutes. In this case, the entry creation determination unit 151 changes the entry time width of the access pattern "C" in the access pattern table 124 from "15 minutes" to "10 minutes". Moreover, the entry creation determination unit 151 sets a condition for an access time width w of the access pattern "C" in the access pattern table 124 to "5 minutes≤w≤10 minutes", and sets a condition for an access pattern "D" to "10 minutes<w".

Thus, an information processing device 100 adjusts the entry time width in the access pattern table 124 according to the actual access time width, thereby matching the entry time width with the actually required time width. Thereby, the information processing device 100 can reduce a possibility that redundant data will be read in response to the read request, and improve efficiency of read access to the KVS 110.

Note that, as illustrated in FIG. 2, functions of the information processing device 100 can be used to provide various services.

Figure 31:
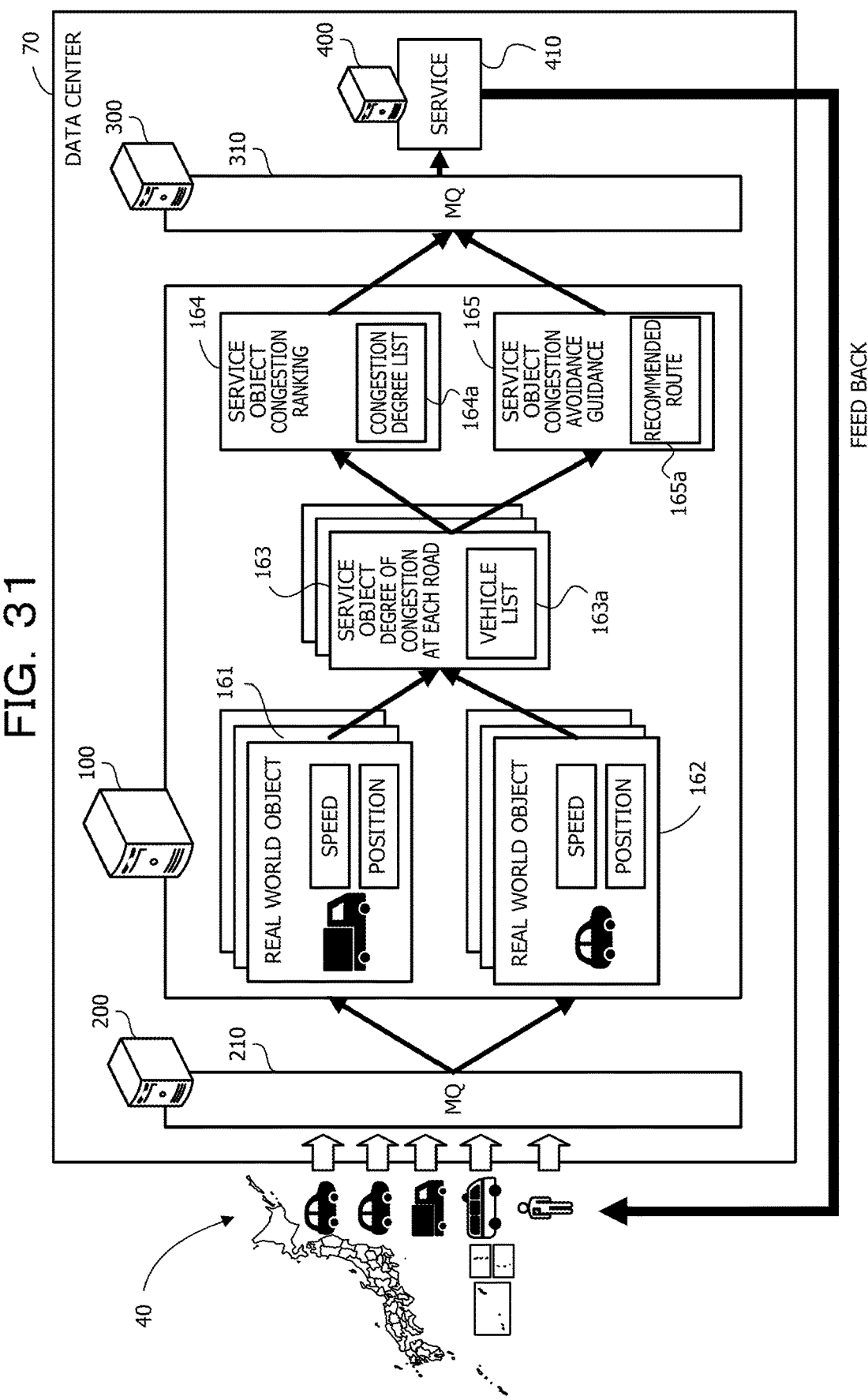
FIG. 31 is a diagram illustrating an example of providing a service by an information processing system.

FIG. 31 is a diagram illustrating an example of providing a service by an information processing system.

For example, data center 70 has the information processing device 100 and message queue servers 200 and 300. The data center 70 further has a server 400. The message queue server 200 has a message queue (MQ) 210. The message queue server 300 has an MQ 310. The server 400 executes a service 410. The service 410 acquires data held in the MQ 310 and uses the data to notify a device group 40 including connected cars 41 to 43 and an IoT device 44 of congestion information, detour route information, advertisement recommendation information, and the like. Note that the data center 70 may have a plurality of information processing devices 100 and servers 400, respectively.

The information processing device 100 has real world objects 161, 162, and the like including vehicle objects and human objects, and service objects 163, 164, and 165. The real world objects 161, 162, and the like acquire and hold speed, position, driving log, and the like transmitted in units of seconds from the device group 40 via the MQ 210.

The service objects 163, 164, and 165 are examples of user logics, and execute predetermined processing based on data such as the speed and position corresponding to the real world objects 161, 162, and the like. For example, the service object 163 detects the degree of congestion for each road, generates a vehicle list 163a indicating the degree of congestion for each road, and provides the service objects 164 and 165 with the vehicle list 163a. The service object 164 determines a congestion ranking for each road based on the vehicle list 163a, and stores the congestion degree list 164a indicating the congestion ranking in the MQ 310. Furthermore, the service object 165 performs processing for congestion avoidance guidance for each road, and stores information of a recommended route 165a for congestion avoidance in the MQ 310. The service 410 feeds back an advertisement recommendation service and a congestion notification service to the device group 40 based on the congestion degree list 164a and the recommended route 165a.

In the information processing device 100, data used by the real world objects 161, 162, and the like, and the service objects 163, 164, and 165 is stored in the KVS 110. As exemplified in the second to sixth embodiments, the information processing device 100 can reduce the number of reads associated with data read from the KVS 110 and improve read efficiency. For example, data read from the KVS 110 is speeded up. Therefore, services can be provided to the device group 40 in real time with little delay. That is, the information processing device 100 enables appropriate guidance notifications according to the status of the device group 40 that changes from moment to moment.

Note that, for a data structure of the KVS 110, a log-structured merge tree (LSM-tree) is used, for example. The LSM-tree is one of index structures and data storage structures using the index structure, and is characterized by fast write and slow read compared to write. Stream processing that processes a large amount of input data at high speed often uses the KVS 110 using the LSM-tree structure for high-speed write. The functions of the information processing device 10 according to the first embodiment and the information processing devices 100 according to the second to sixth embodiments are particularly effective for speeding up the read in a data structure with a relatively slow read speed, such as an LSM-tree structure.

As described above, the information processing device 100 executes the following processing.

An event processing unit 130 determines a first time width with the longest time width or longer among the time widths to be read based on a read request from each program to the KVS 110 that holds data corresponding to time, as the time width to be associated with one entry in the KVS 110. The event processing unit 130 creates entries corresponding to a plurality of data belonging to the time range of the first time width based on input data for each time and stores the entries in the KVS 110.

Thereby, the information processing device 100 can reduce the number of reads associated with data read from the KVS 110. As a result, the information processing device 100 can speed up the read of data from the KVS 110. Each of user logics 133, 134, and 135 is an example of a program that issues the read request to the KVS 110.

The event processing unit 130 may set the first time width to the same length as the longest time width among the time widths to be read based on the read request from each program. That is, the first time width may be the same length as the longest time width. Thereby, the information processing device 100 can reduce the number of reads associated with data read from the KVS 110. Furthermore, the information processing device 100 can easily determine the first time width.

The event processing unit 130 may determine a candidate for the time width longer than the longest time width and with a minimum difference from the longest time width, as the first time width, based on first information indicating a plurality of candidates for the time width to be associated with one entry.

Thereby, the information processing device 100 can reduce the number of reads associated with data read from the KVS 110. Note that the access pattern table 124 is an example of the first information.

In the first information, each of the plurality of candidates for the time width to be associated with one entry may be associated with an access pattern indicating a range of an access time width which indicates the time width of the read request and is shorter than the candidate. The event processing unit 130 may calculate an occurrence percentage in a predetermined period of the read request for each access pattern based on a read request history of each access pattern. The event processing unit 130 may specify the longest time width, excluding the read requests corresponding to the access patterns with the occurrence percentage lower than a certain percentage.

Thereby, the information processing device 100 can appropriately determine the time width to be associated with one entry. As described above, if the entry time width is determined based on the access patterns with a relatively low occurrence percentage, the time width may become too large or too small, and there is a possibility that read efficiency from the KVS 110 decreases. Therefore, the information processing device 100 can suppress the decrease in the read efficiency by specifying the longest time width, excluding the read requests corresponding to the access patterns with the occurrence percentage lower than a certain percentage. Note that a pattern counting table 125 is an example of a history of read requests for each access pattern.

The occurrence percentage in a pattern occurrence percentage table 126 is an example of the occurrence percentage in a predetermined period of the read requests for each access pattern.

The event processing unit 130 may set the candidates for the time width of the entry to be created this time to a time width one step shorter than the first time width of previous time, the first time width of the previous time, and a time width one step longer than the first time width of the previous time, based on the first information, with respect to the first time width of the entry created previous time. Thereby, the information processing device 100 can efficiently determine the time width of entries. Furthermore, the information processing device 100 can suppress abrupt lengthening or abrupt shortening of the time width of entries.

For example, as exemplified in the fourth embodiment, the plurality of candidates for the time width may be values of nth power of 2 (where n is an integer equal to or greater than 0). Then, in a case where the first time width of the entry created previous time is a value of mth power of 2 (m is an integer equal to or greater than 1), the event processing unit 130 may set the plurality of candidates for the time width of the entry to be created next to a value of $(m-1)$th power of 2, a value of mth power of 2, and a value of $(m+1)$th power of 2.

The event processing unit 130 may perform the following processing in a case where the time width to be read based on the read request and the time width of the entry to be created are constant for a predetermined time. The event processing unit 130 detects that a difference in start time between a first time range to be read based on the read request and a second time range corresponding to the entry read in response to the read request is constant for a predetermined time. Then, the event processing unit 130 shifts an end time of a third time range corresponding to the entry to be created next backward by the amount of the difference.

Thereby, the information processing device 100 can match the start time of the time range of the entry in the KVS 110 with the start time of the time range specified by the read request, and can further reduce the number of reads of data from the KVS 110. Note that the case where the time width to be read based on the read request and the time width of the entry to be created are constant for a predetermined time means, for example, a case where a state in which the time width to be read based on the read request and the time width of the entry to be created match with a certain value continues for a predetermined time.

Furthermore, in a case where the candidate for the time width included in the first information, which is specified for the specified longest time width, is different from the longest time width, the event processing unit 130 may change the candidate for the time width included in the first information based on the specified longest time width. For example, the event processing unit 130 shortens the appropriate candidate for the time width to be shorter than the appropriate candidate for the time width and to be equal to or longer than the specified longest time width. The event processing unit 130 may set the appropriate candidate for the time width to be the same as the specified longest time width.

Thereby, the information processing device 100 can adjust the time width of one entry in the KVS 110 so as not to be too long with respect to the time width of the actual read request. As a result, the information processing device 100 can improve the efficiency of read from the KVS 110.

For example, there is a case where the candidate for the time width included in the first information, which corresponds to a first access pattern to which the specified longest time width belongs, differs from the specified longest time width. In this case, the event processing unit 130 may change the candidate for the time width associated with the first access pattern in the first information based on the specified longest time width. For example, the event processing unit 130 shortens the candidate for the time width associated with the first access pattern to be shorter than the candidate for the time width and to be equal to or longer than the specified longest time width. The event processing unit 130 may set the candidate for the time width associated with the first access pattern to be the same as the specified longest time width.

Thereby, the information processing device 100 can adjust the time width of one entry in the KVS 110 so as not to be too long with respect to the time width of the actual read request. As a result, the information processing device 100 can improve the efficiency of read from the KVS 110.

Furthermore, the event processing unit 130 may specify the longest time width to be read in the read request based on the read requests that have been accepted since the entry in the KVS 110 was created previous time to the present. Thereby, the information processing device 100 can dynamically adjust the time width to be associated with one entry according to the status of the time width to be read based on the current read request by each program (each user logic). Furthermore, the time width to be associated with one entry can be appropriately adjusted according to the status of the time width to be read based on the current read request. Therefore, the efficiency of the read of data from the KVS 110 can be further improved. For example, both the reduction in the number of reads and the suppression of an excessive increase in the time width of an entry with respect to the time width of the read request can be achieved. As a result, the read of data from the KVS 110 can be speeded up.

For example, when the event processing unit 130 stores the created entry in the KVS 110, the event processing unit 130 deletes the information of the time width actually specified in the read request, the information having been recorded to date. Then, the event processing unit 130 starts new recording of the actually specified time width in order to determine the first time width at the time of creating the next entry. Here, access width maximum value information 122, the pattern counting table 125, and the pattern occurrence percentage table 126 are examples of information of the time width actually specified in the read request.

Furthermore, the data stored in the KVS 110 may be sensor data acquired by a sensor. For example, the functions of the information processing device 100 are suitable for a stream processing platform that performs stream processing for sensor data transmitted in time-series from sensors.

Furthermore, one entry in the KVS 110 may have a key corresponding to a time range and a value containing data corresponding to each of a plurality of pieces of time belonging to the time range. Thereby, the information processing device 100 can easily read the data in the time range from the KVS 110 by specifying the time range for reading by each program.

Note that the information processing according to the first embodiment may be implemented by causing the processing unit 12 to execute a program. Furthermore, the information processing according to the second embodiment may be implemented by causing the CPU 101 to execute the program. The program can be recorded in the computer-readable recording medium 23.

For example, the program can be distributed by distributing the recording medium 23 in which the program is recorded. Alternatively, the program may be stored in another computer and distributed via a network. For example, a computer may store (install) the program recorded in the recording medium 23 or received from another computer, in a storage device such as the RAM 102 or the HDD 103, and read the program from the storage device to execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method performed by a computer for creating an entry in a key-value store, the method comprising:
   receiving, in real time, time-series data items each of which includes a respective time stamp and a value;
   buffering the received time-series data items in a latest entry associated with a latest key in the key-value store, the key-value store storing a plurality of entries each of which includes a pair of a key and a value set, the key of each entry being set with a respective time range defined by a given time width, the value set of each entry including one or more of time-series data items;
   receiving, from a plurality of programs, a plurality of read requests to the key-value store, each read request of the plurality of read requests including a time width to which data to be read by the each read request belongs;
   determining a first time width based on a longest time width among time widths in the plurality of read requests, the first time width being a time width equal to or longer than the longest time width; and
   creating a first entry that includes a pair of a first key and a first value set to store the first entry to the key-value store, the first key being set with a first time range having the first time width, the first value set including a plurality of time-series data items that belongs to the first time range among the buffered time-series data items in the latest entry.

2. The method according to claim 1, wherein the first time width has a same length as the longest time width.

3. The method according to claim 1, wherein in the determining,
   a candidate for the time width longer than the longest time width and with a minimum difference from the longest time width, based on first information that indicates a plurality of candidates for the time width to be associated with the one entry, is determined as the first time width.

4. The method according to claim 3, wherein,
   in the first information, each of the plurality of candidates for the time width is associated with an access pattern that indicates a range of an access time width, which indicates the time width in the read request and is shorter than the candidate, and
   the computer calculates an occurrence percentage in a predetermined period of the read request for each the access pattern based on a history of the read request for the each access pattern, and specifies the longest time width, excluding the read request that corresponds to the access pattern with the occurrence percentage lower than a certain percentage.

5. The method according to claim 3, wherein the computer sets, based on the first information, the candidates for the time width of the entry to be created this time to a time width one step shorter than the first time width of a previously created entry, a first time width same as the first time width of the previously created entry, and a time width one step longer than the first time width of the previously created entry.

6. The method according to claim 1, wherein, in a case where the time width to be read based on the read request and the time width of the entry to be created are constant for a predetermined time, when a computer detects that a difference in start time between a first time range to be read based on the read request and a second time range that corresponds to the entry read based on the read request is constant for a predetermined time, the computer shifts end time of a third time range that corresponds to the entry to be created next time backward by an amount of the difference.

7. The method according to claim 3, wherein in a case where the candidate that is for the time width included in the first information and is specified for the specified longest time width is different from the longest time width, the computer changes the candidate for the time width included in the first information based on the longest time width.

8. The method according to claim 1, wherein the computer specifies the longest time width based on the read requests that have been accepted since previous creation of the entry to present.

9. The method according to claim 1, wherein the data is sensor data acquired by a sensor.

10. The method according to claim 1, wherein the one entry in the key-value store has a key that corresponds to a time range and a value that includes the data that corresponds to each of a plurality of pieces of time that belongs to the time range.

11. A non-transitory computer-readable recording medium storing an entry creation program of creating an entry in a key-value store, the entry creation program being a program that causes a computer to perform a process comprising:

receiving, in real time, time-series data items each of which includes a respective time stamp and a value;

buffering the received time-series data items in a latest entry associated with a latest key in the key-value store, the key-value store storing a plurality of entries each of which includes a pair of a key and a value set, the key of each entry being set with a respective time range defined by a given time width, the value set of each entry including one or more of time-series data items;

receiving, from a plurality of programs, a plurality of read requests to the key-value store, each read request of the plurality of read requests including a time width to which data to be read by the each read request belongs;

determining a first time width based on a longest time width among time widths in the plurality of read requests, the first time width being a time width equal to or longer than the longest time width; and creating a first entry that includes a pair of a first key and a first value set to store the first entry to the key-value store, the first key being set with a first time range having the first time width, the first value set including a plurality of time-series data items that belongs to the first time range among the buffered time-series data items in the latest entry.

* * * * *